(12) United States Patent
Ozaki et al.

(10) Patent No.: US 12,251,627 B2
(45) Date of Patent: Mar. 18, 2025

(54) FOOT-OPERATED ROBOT INTERFACE

(71) Applicant: Cardinal Gibbons High School, Raleigh, NC (US)

(72) Inventors: Grant Christian Ozaki, Cary, NC (US); Benjamin James Miranda, Durham, NC (US); Thomas Ryan Michael Greene, Raleigh, NC (US); Brett Matthew Lopez, Raleigh, NC (US); Charles Joseph Kilani, Raleigh, NC (US); William Michael Meyers, Chapel Hill, NC (US); Grace Ann Eberle, Raleigh, NC (US); Ian Setia, Raleigh, NC (US); Joseph Michael Biersack, Morrisville, NC (US); Joseph Andrew Milazzo, Cary, NC (US); Brett Richard Gallagher, Raleigh, NC (US); Cassian Farias Kraus, Apex, NC (US); Nicole Carol Allen, Raleigh, NC (US); Kevin Nicolas Haller, Chapel Hill, NC (US)

(73) Assignee: Cardinal Gibbons High School, Raleigh, NC (US)

( * ) Notice: Subject to any disclaimer, the term of this patent is extended or adjusted under 35 U.S.C. 154(b) by 491 days.

(21) Appl. No.: 17/677,003

(22) Filed: Feb. 22, 2022

(65) Prior Publication Data
US 2022/0176238 A1  Jun. 9, 2022

(51) Int. Cl.
*A63F 13/245* (2014.01)

(52) U.S. Cl.
CPC .................................. *A63F 13/245* (2014.09)

(58) Field of Classification Search
CPC .... A63F 13/245; A63F 13/211; A63F 13/218; A63F 13/803; A63F 13/98; A63F 13/235; A63H 17/00; A63H 17/395; A63H 30/04
See application file for complete search history.

(56) References Cited

U.S. PATENT DOCUMENTS

| 4,488,017 A | * | 12/1984 | Lee | G06F 3/0334 345/161 |
| 4,817,950 A | * | 4/1989 | Goo | A63F 13/807 482/901 |
| 5,409,226 A | * | 4/1995 | Mesko | A63F 13/428 463/36 |

(Continued)

OTHER PUBLICATIONS

Inside a Blue Shark MYMYBOX Metal Dance Pad—Dance Dance Revolution. Youtube.com. Online. May 5, 2020. Accessed via the Internet. Accessed Jul. 27, 2024. <URL: https://www.youtube.com/watch?v=6HP98jgoGfl> (Year: 2020).*

*Primary Examiner* — Justin L Myhr
*Assistant Examiner* — Carl V Larsen
(74) *Attorney, Agent, or Firm* — Haynes and Boone, LLP

(57) ABSTRACT

Disclosed is a system for controlling a robot via a foot-operable controller. The foot-operable controller includes a grid of large pressure-sensitive tiles that are responsive to being stepped on. Signals from the pressure-sensitive tiles are provided to a controller interface that converts the signals to control messages compatible with existing robot control interfaces, such as a universal serial bus. The foot-operable controller may be used to control various robots, including for example a robot equipped with a claw arm or a robot equipped with a ring launcher.

17 Claims, 22 Drawing Sheets

(56) References Cited

U.S. PATENT DOCUMENTS

| | | | | |
|---|---|---|---|---|
| 10,503,199 | B1* | 12/2019 | Cone | G05G 1/305 |
| 11,191,596 | B2* | 12/2021 | Thompson | G06F 3/0334 |
| 2004/0147317 | A1* | 7/2004 | Ito | A63F 13/45 |
| | | | | 463/36 |
| 2006/0184272 | A1* | 8/2006 | Okazaki | B25J 9/1697 |
| | | | | 700/245 |
| 2007/0139513 | A1* | 6/2007 | Fang | H04N 7/142 |
| | | | | 348/14.01 |
| 2009/0119030 | A1* | 5/2009 | Fang | A63F 13/803 |
| | | | | 702/41 |
| 2011/0040427 | A1* | 2/2011 | Ben-Tzvi | B62D 55/12 |
| | | | | 701/2 |
| 2011/0306425 | A1* | 12/2011 | Rivard | A63F 13/24 |
| | | | | 463/37 |
| 2015/0141878 | A1* | 5/2015 | Roy | A61H 1/02 |
| | | | | 601/34 |
| 2017/0160793 | A1* | 6/2017 | Perlin | G06F 3/011 |
| 2017/0282918 | A1* | 10/2017 | Chang | B60W 30/18109 |
| 2019/0046871 | A1* | 2/2019 | Froy | G07F 17/32 |
| 2019/0220086 | A1* | 7/2019 | Tett | A61B 5/4023 |
| 2019/0329402 | A1* | 10/2019 | Cappello | G05B 19/0426 |
| 2019/0344449 | A1* | 11/2019 | Williams | B25J 9/1605 |
| 2021/0344541 | A1* | 11/2021 | Shellhammer | H04L 5/0023 |
| 2021/0380189 | A1* | 12/2021 | Tett | A63F 13/218 |
| 2021/0401527 | A1* | 12/2021 | Hassan | A61B 34/30 |
| 2022/0081816 | A1* | 3/2022 | Bentley | D05B 21/00 |
| 2022/0244726 | A1* | 8/2022 | Shigeta | H04N 7/185 |

\* cited by examiner

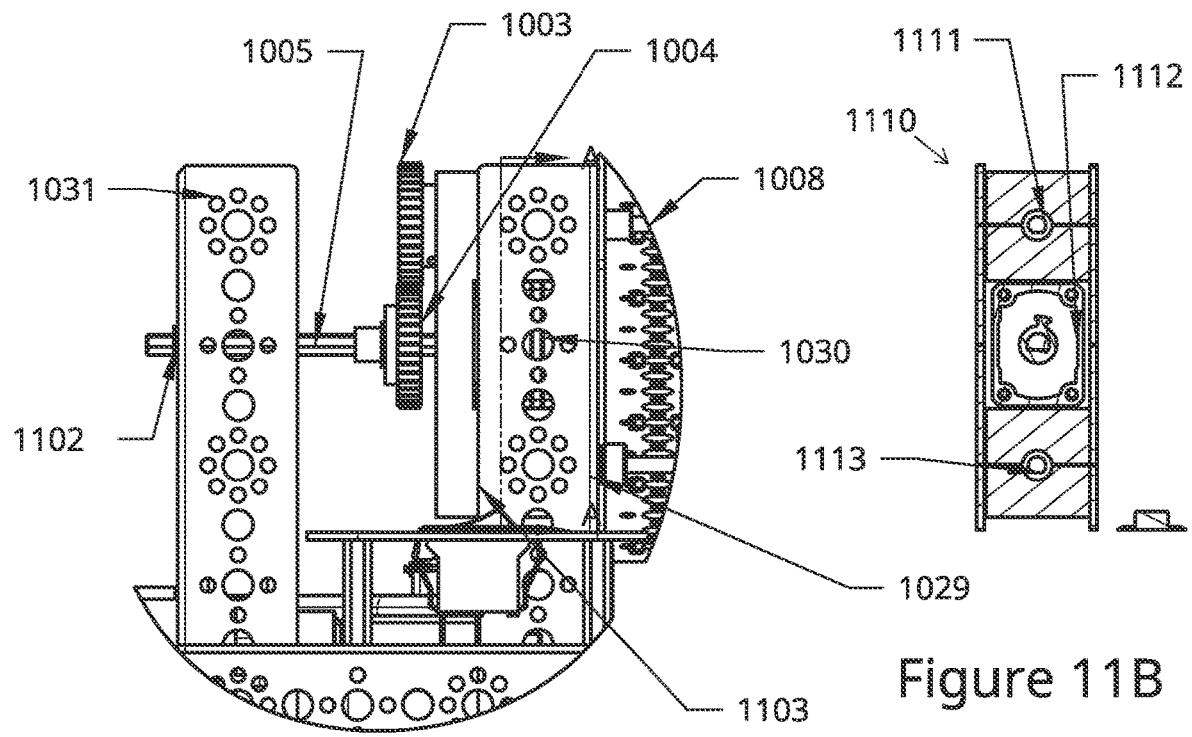
Figure 11A
Figure 11B
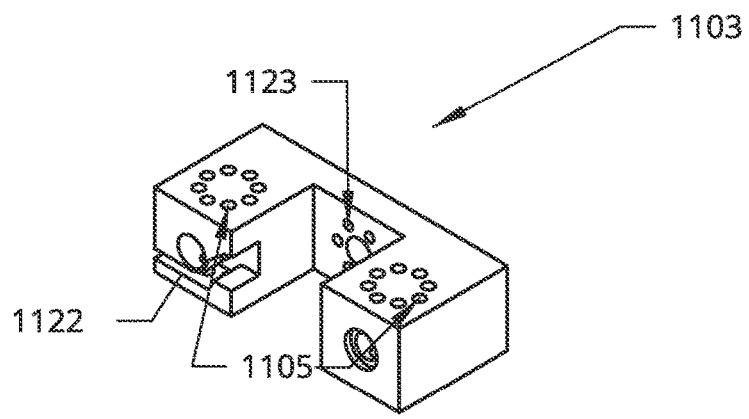
Figure 11C

FOOT-OPERATED ROBOT INTERFACE

TECHNICAL FIELD

The subject matter described herein relates to a system for controlling a robot. This system has a particular but not exclusive utility for education, construction, and manufacturing.

BACKGROUND

Sharing a game controller with others is commonplace at social or outreach events, but such sharing can raise societal concerns regarding the spread of communicable diseases. A person using a hand-operated controller may contaminate the controller with a microbe, virus, or fungus, which may, in turn, infect the next person (or multiple subsequent persons) to use the hand-held controller. In other situations, a hand-held controller may be impractical or infeasible, for example, because of physical limitations of the person or other simultaneous activities engaged in by the person. Therefore, what is needed in the art is an improved way to provide controller inputs to devices, such as remotely operated robots, that may reduce or eliminate the need for using a hand-held controller.

BRIEF DESCRIPTION OF THE DRAWINGS

FIG. 11A is a side view of a bracket connecting a potentiometer to a clawbot.

FIG. 11B is a front view of a mounted potentiometer.

FIG. 11C is a perspective view of a potentiometer mount.

DETAILED DESCRIPTION

Figure 1:
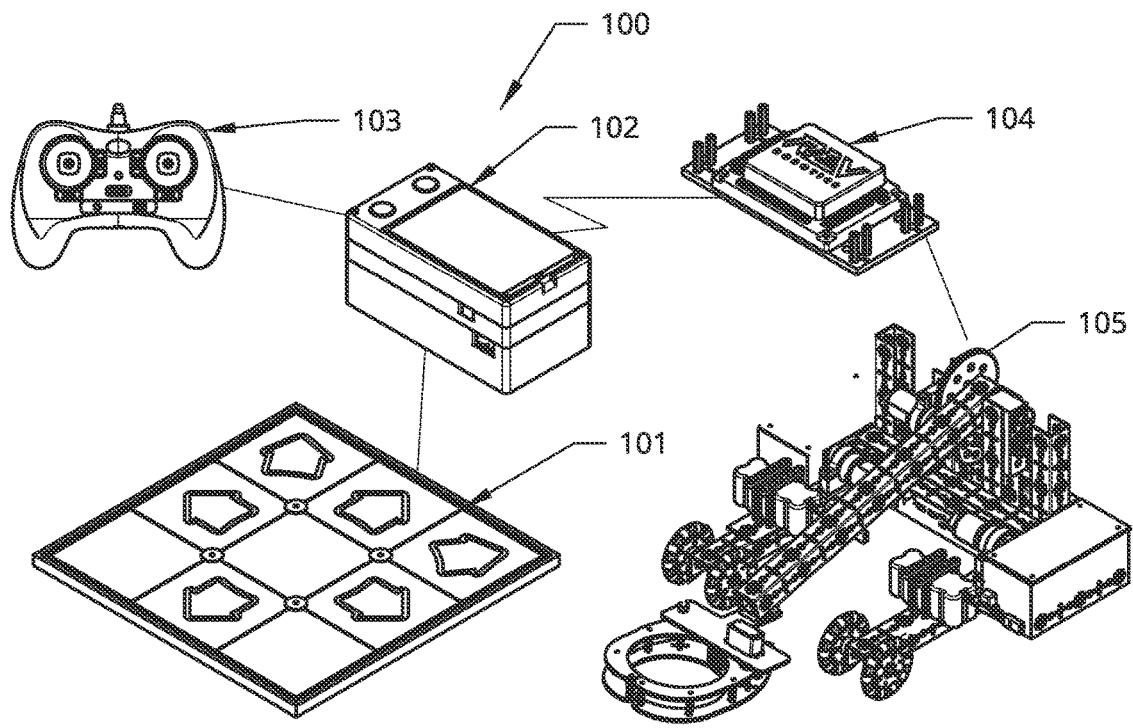
FIG. 1 is a perspective view of a foot-operated robot system and clawbot embodying principles of the present invention.

FIG. 1 illustrates a perspective view of a foot-operated robot control system 100 wirelessly connected to a robotic vehicle 105. Foot-operated robot control system 100 includes a foot-operated controller 101, a controller box 102, a game controller 103, and a robot control hub 104. Game controller 103 may preferably be an F310 gamepad commercially available from Logitech International, S.A., of Lausanne, Switzerland. In the exemplary embodiment depicted in FIG. 1, robotic vehicle 105 is a clawbot having a frame supporting a variety of additional components which may pick up, transport, and release objects.

Figure 2:
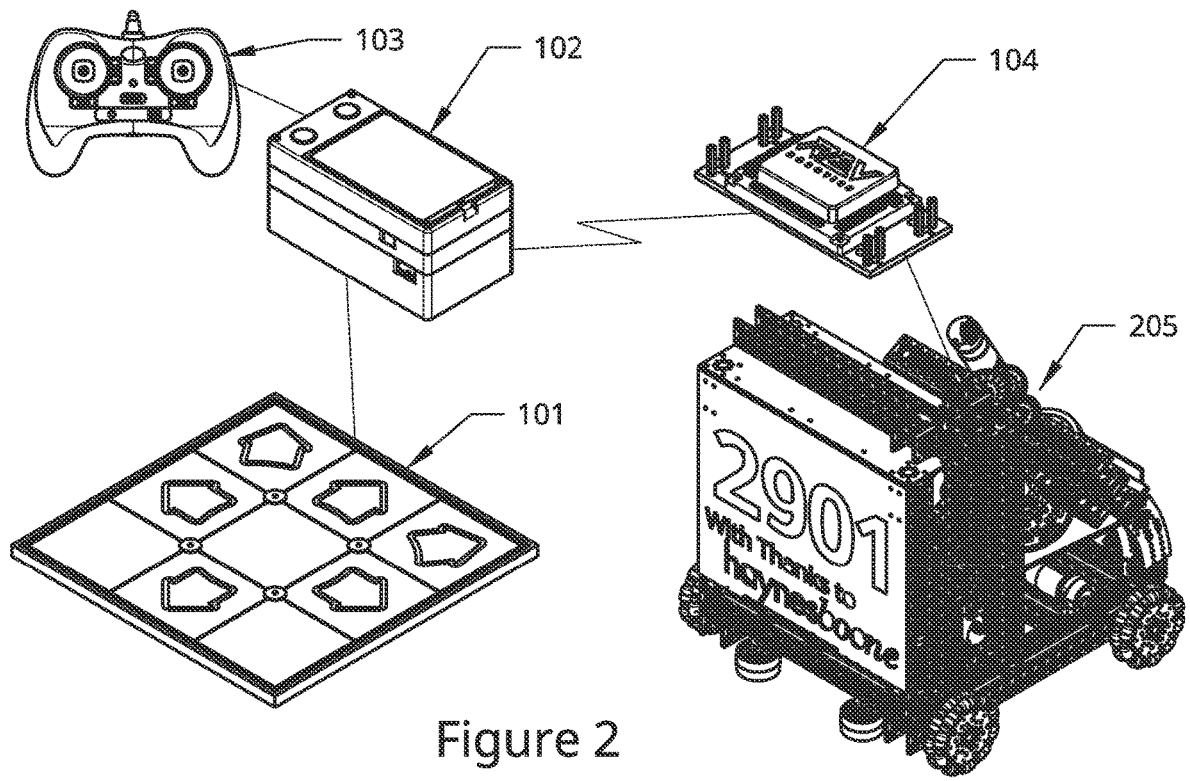
FIG. 2 is a perspective view of a foot-operated robot system and launcherbot embodying principles of the present invention.

Illustrated in FIG. 2 is a perspective view of foot-operated robot control system 100 attached to a different robotic vehicle 205. In the exemplary embodiment depicted in FIG. 2, robotic vehicle 205 is a launcherbot that may pick up deformable rings from the floor, transport the deformable rings, and launch the deformable rings at a target.

Figure 3A:
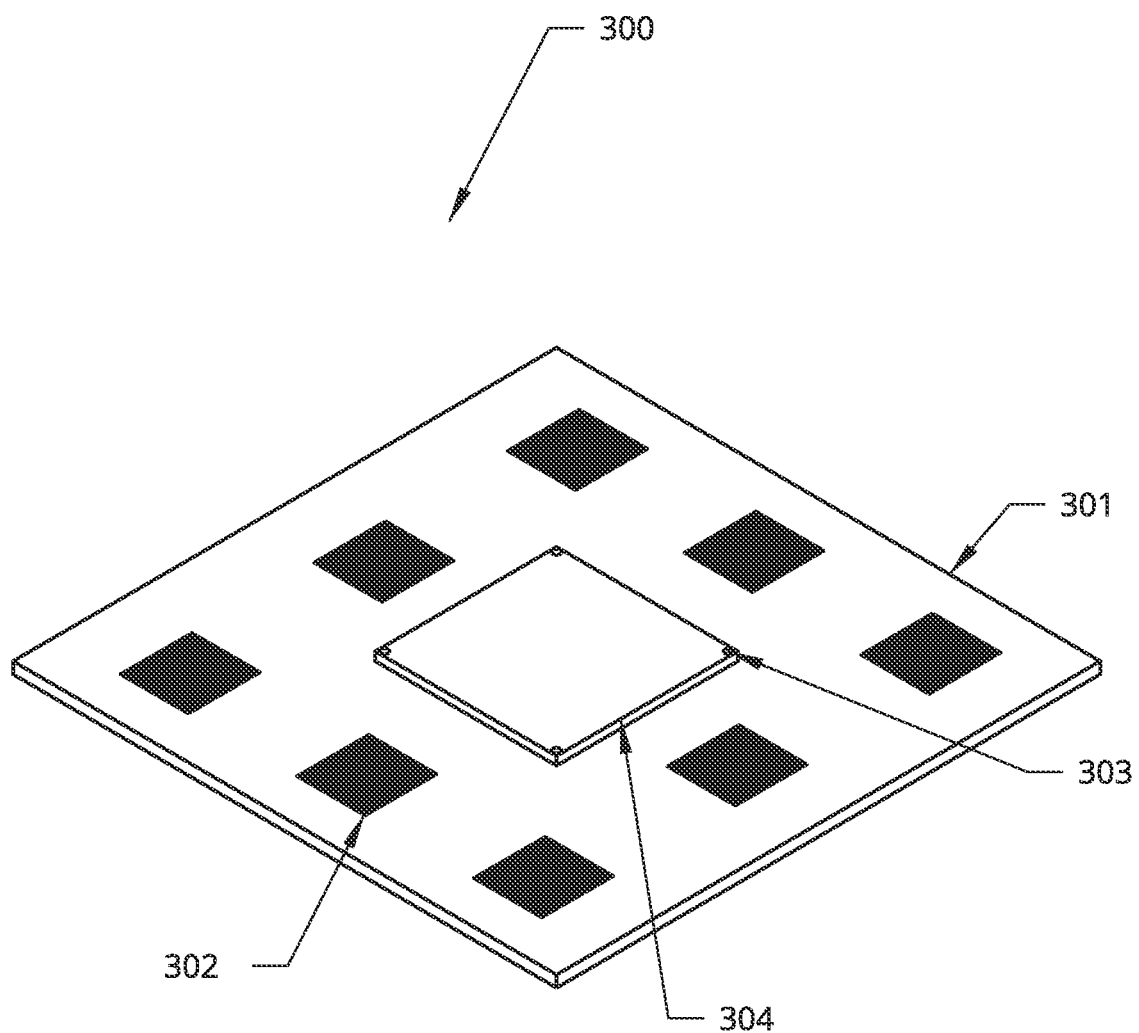
FIG. 3A is a top view of a foot-operated controller base layer.

FIG. 3A illustrates a perspective view of a base layer 300 of foot-operated controller 101. Base layer 300 may include a square wooden base 301 and eight wiring squares 302. Base 301 may optionally include centered elevated square 304 for stability. Elevated square 304 may be rigidly attached to base 301 using a plurality of screws 303. In other embodiments, base 301 may be formed from other materials, e.g., plastic or metal, and may be a different shape, e.g., circular. Base 301 is depicted as including eight wiring recesses 302 for accepting portions of electrical wiring that facilitate detecting a user's input. In other embodiments, wiring recesses 302 may be a different shape, e.g., circular, and may include a different number than eight wiring recesses, e.g., six recesses.

Figure 3B:
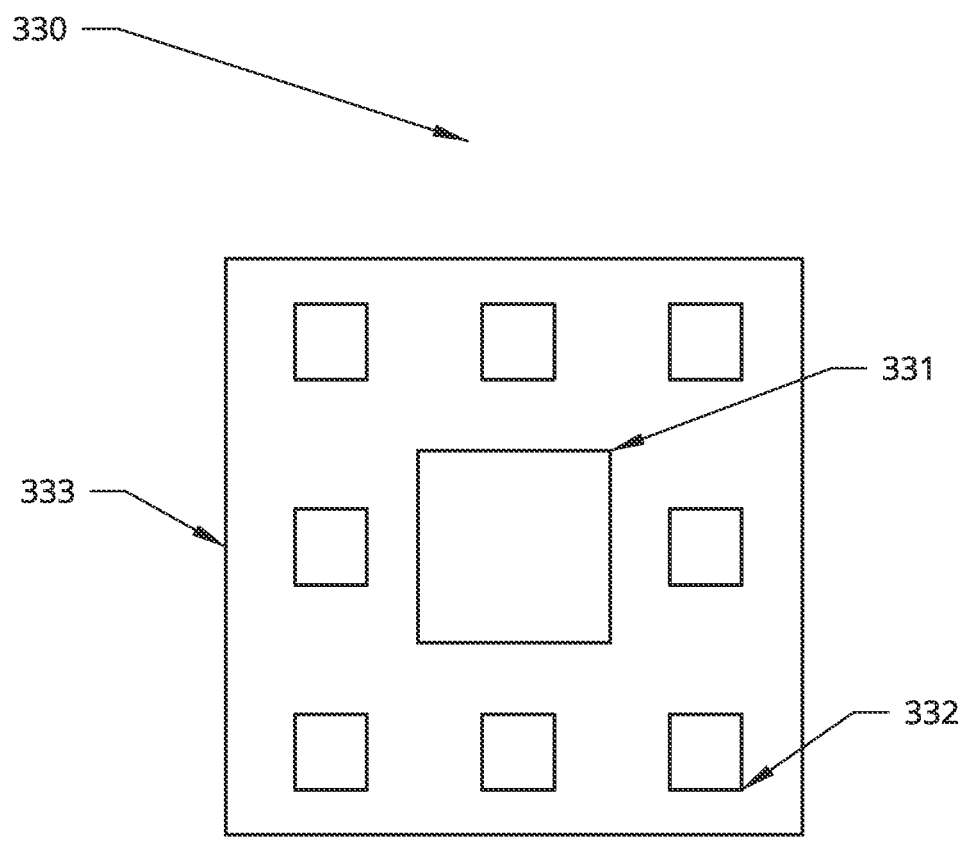
FIG. 3B is a top view of a foot-operated controller middle layer.

FIG. 3B illustrates a top view of a middle layer 330 of foot-operated controller 101 comprised of a thick foam layer 333. Thick foam layer 333 may provide cushioning for foot-operated controller 101. Thick foam layer 333 may have a cut out 331 for the elevated center square 304 and a plurality of pressure sensor cut outs 332.

Figure 3C:
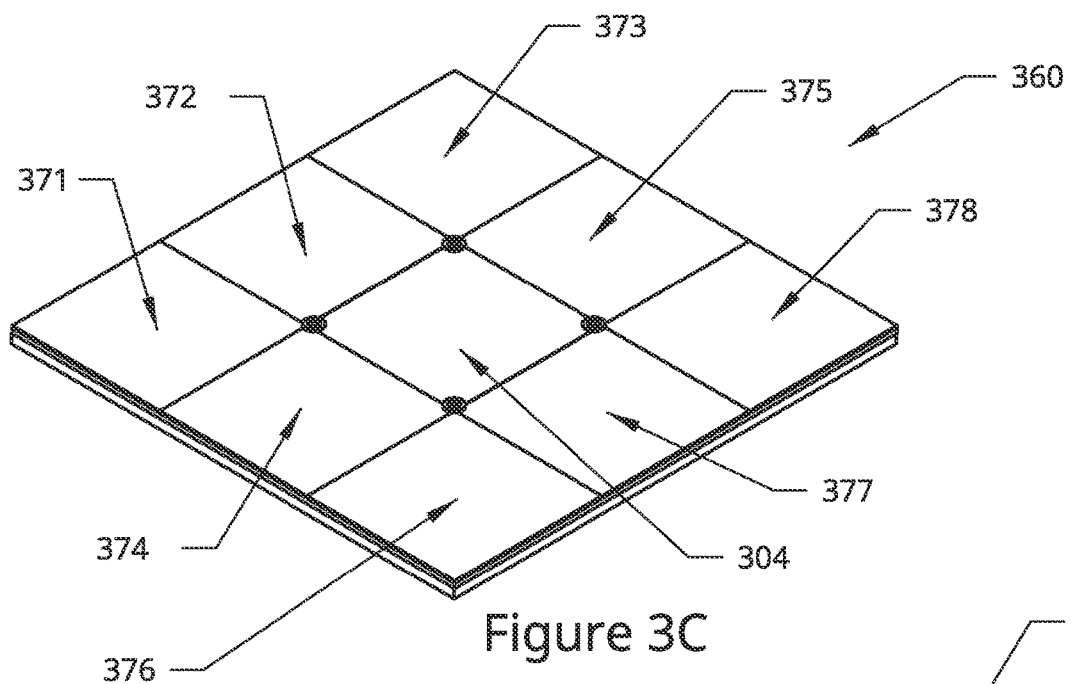
FIG. 3C is a top view of a foot-operated controller top layer.

Illustrated in FIG. 3C is a perspective view of a top layer 360 of foot-operated controller 101 including a plurality of pressure tiles. Top layer 360 includes centered elevated square 304 surrounded by a plurality of pressure tiles 371, 372, 373, 374, 375, 376, 377, 378. In some embodiments, each pressure tile activates a function or feature of a robot. In one embodiment, robotic vehicle 105 is connected to foot-operated robot system 100, and pressure tile 371 commands a clawbot arm (see FIG. 1) to lower. Conversely, pressure tile 373 commands a clawbot arm to rise. In another embodiment, robotic vehicle 205 is attached to foot-operated robot system 100, and pressure tile 371 may command robotic vehicle 205 to pick up a deformable ring, while pressure tile 373 may command robotic vehicle 205 to launch a deformable ring. In some embodiments, a pressure tile may be associated with a command that is common across multiple robotic vehicles. For example, pressure tile 372 may be a single function button that commands a connected robot to drive forward, while pressure tiles 374, 375 are single function buttons that command a connected robot to turn left (e.g., counterclockwise) and right (e.g., clockwise) respectively. In general, each of the pressure tiles 371-378 may be associated with providing a command to a robot as desired. In some embodiments, a pressure tile may be configured to cause a connected robot to drive backward. Depending on the drivetrain configuration of a connected robot, causing the robot to drive forward, backward, left, or right may include activating one, two, or more motors. For example, where the robot has a portside motor and a starboard motor, the robot may be caused to drive forward or backward by activating both motors simultaneously to initiate motion in the same direction. Similarly, the robot may be caused to turn left by activating a starboard motor to drive in a forward direction; by activating a portside motor to drive in a backward direction; or by activating both in these manners. The robot may be caused to turn right by activating a portside motor to drive in a forward direction; by activating a starboard motor to drive in a backward direction; or by activating both in these manners. In some embodiments, a single motor causes the robot to move forward or backward; for example, a single motor may be coupled to wheels on both port and starboard sides of the robot.

Figure 3D:
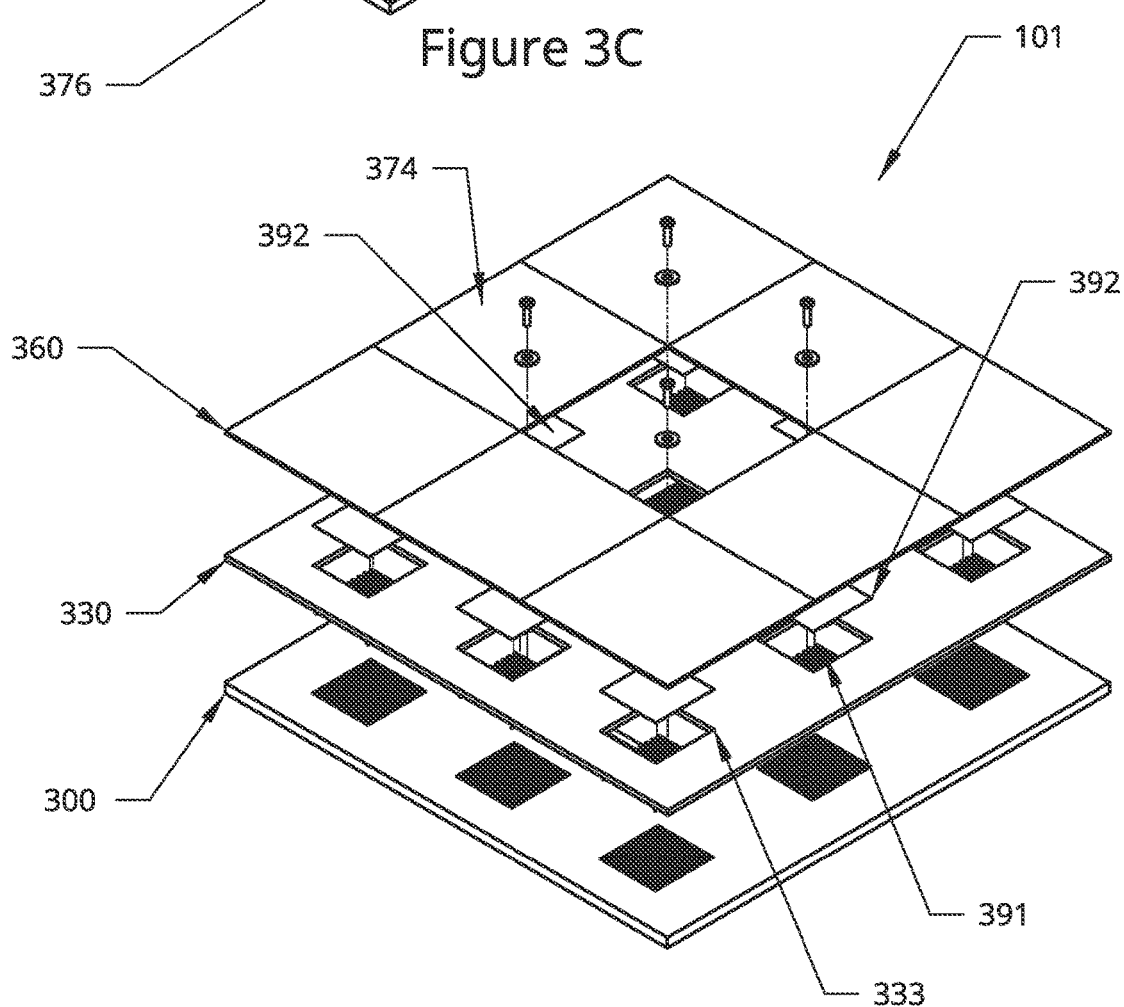
FIG. 3D is an exploded view of a foot-operated controller.

FIG. 3D illustrates an exploded view of foot-operated controller 101. Foot-operated controller 101 includes base 300, middle 330, and top 360. As will be discussed in further detail below, in operation, a user may stand on (or otherwise exert a physical force on) a pressure tile, e.g., pressure tile 374, and the user's weight (or force) may compress thick foam layer 333 causing a pressure sensor 392 to contact electrical wires 391, completing a circuit and triggering the provision of a command to a robot being controlled. For example, the completion of the circuit may cause or include changing a voltage level on a wire or between two wires. The pressure tiles are preferably of equal sizes and arranged in a grid layout as shown. To facilitate foot-operation, the pressure tiles are each preferably sized to accommodate being stepped on. In one embodiment, each pressure tile has a width of twelve inches and a length of twelve inches, for a total surface area of 144 square inches. In another embodiment, each pressure tile has dimensions of 16 inches by 16 inches, for a total surface area of 256 square inches.

It may be desirable to employ foot-operated controller 101 to control a robot that may not have been originally designed to receive inputs from foot-operated controller 101. As discussed further below, the inventors have devised a novel approach to retrofitting an existing robot control system to accept and respond to inputs provided via foot-operated controller 101. In some embodiments, a robot may be designed to accept inputs from a commercially available game controller 103, such as an F310 controller available from Logitech International, SA. To generate an output signal for controlling such a robot, the output from foot-operated controller 101 may mimic a command from a Logitech F310 gamepad. A Logitech F310 gamepad has multiple buttons and joystick inputs that may control a connected robotic vehicle. The inventors have devised a novel approach to electrically connecting foot-operated controller 101 to a Logitech F310 gamepad controller board so that depressing a pressure tile 371-378 electrically activates the F310 gamepad controller board in the same way that it would be activated by manually pressing one of the inputs on the F310 gamepad. Therefore, by connecting each pressure tile 371-378 of foot-operated controller 101 to a corresponding input on a Logitech F310 gamepad controller board, a robot designed to be controlled via a Logitech F310 gamepad controller may be made to receive commands input via foot-operated controller 101.

Figure 4:
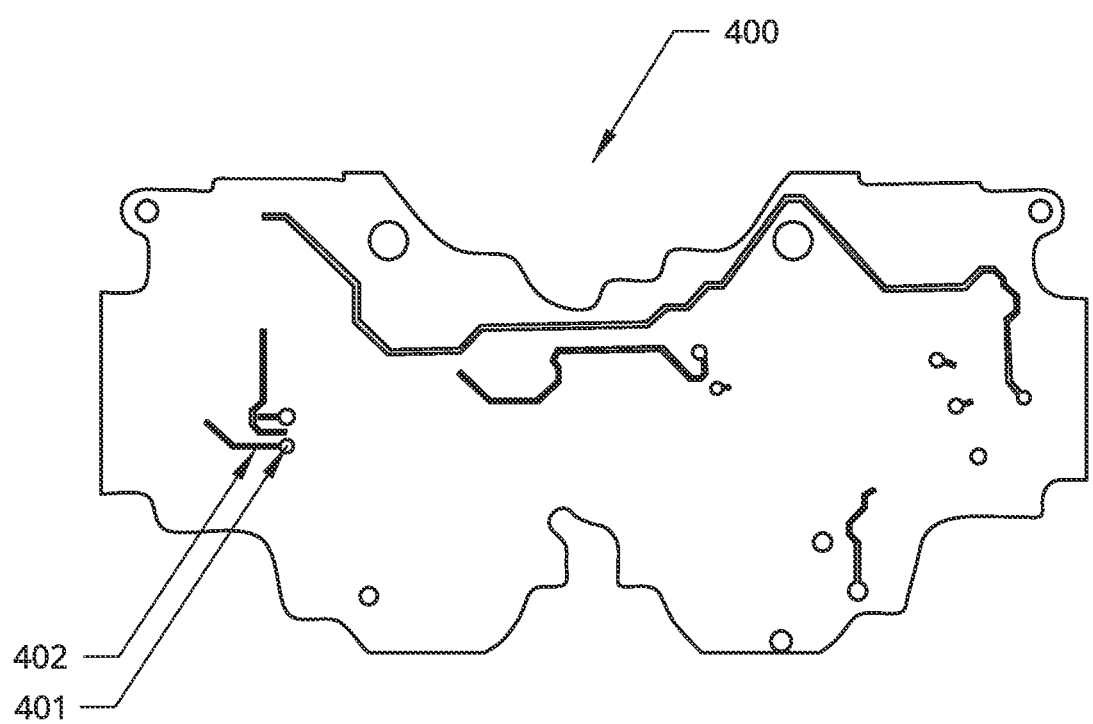
FIG. 4 is a top view of an interface circuit.

Illustrated in FIG. 4 is a controller board 400 that in some embodiments may be extracted and modified from a Logitech F310 gamepad. Controller board 400 may include a plurality of test points 401 and a plurality of copper traces 402. Test points 401 may enable testing of a signal electrically coupled to that location. Copper traces 402 may enable electrical conductivity from one location on controller board 400 to another location on controller board 400. One or more signals from foot-operated controller 101 may be provided to controller board 400 via a mapping diagram of wire connections between the foot-operated controller and the interface circuit 500, as further described with respect to FIG. 5 below. One or more output signals from controller board 400 may be provided to a robotics vehicle. In some embodiments, the controller board 400 includes an output interface that is compatible with a Universal Serial Bus (USB) standard, such as the USB 1.0, 1.1, 1.2, 2.0, 3.0, 3.1, or 3.2 standards maintained by the USB Implementers Forum (USB-IF). Thus, output signals from controller board 400 may be provided in the form of messages formatted in accordance with a USB standard.

Figure 5:
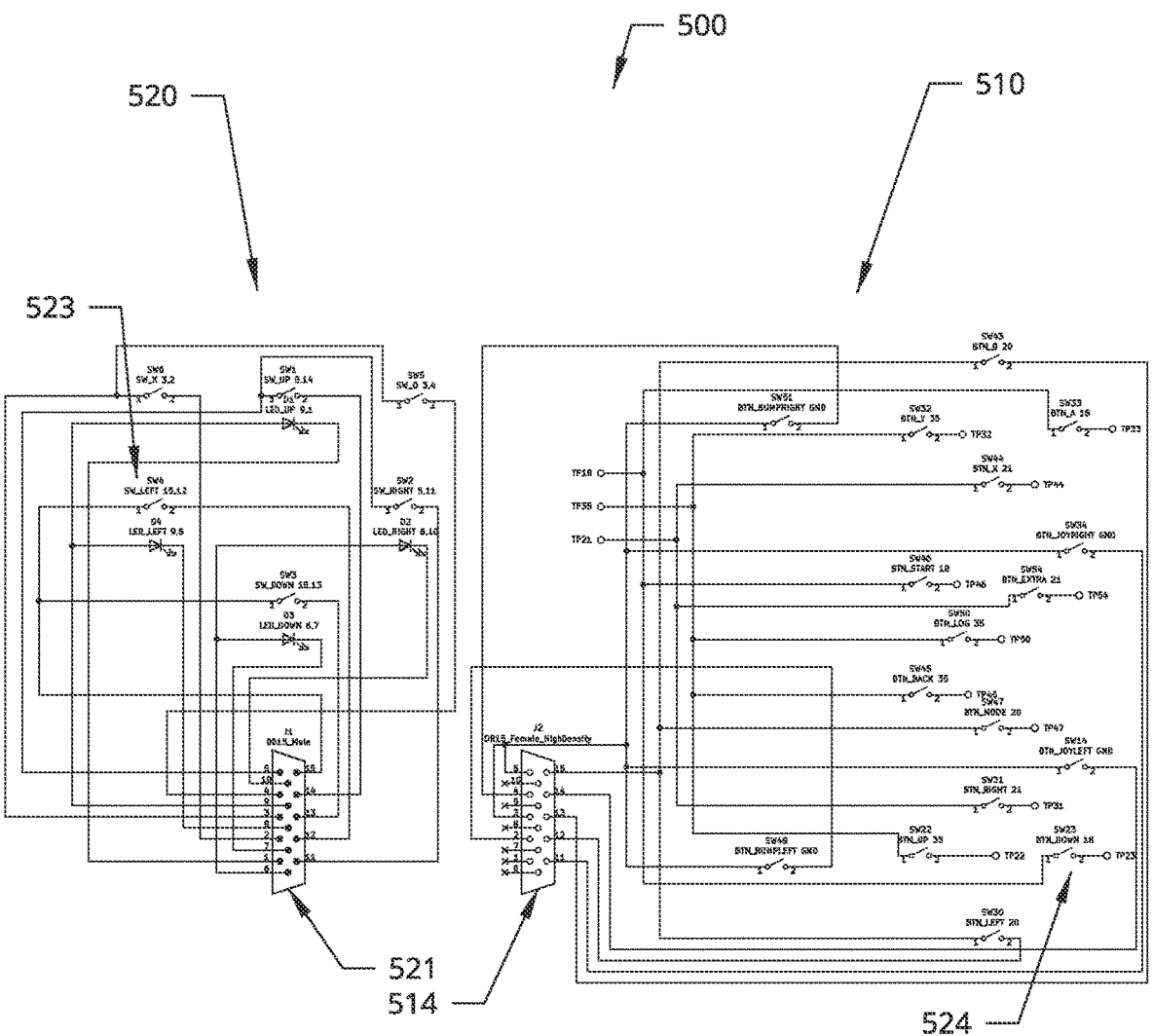
FIG. 5 is a mapping diagram of wire connections between the foot-operated controller and the interface circuit.

FIG. 5 illustrates an interface circuit 500, an exemplary mapping diagram of wiring connections between foot-operated controller 101 and controller board 400. Controller board 400 may control a robotic vehicle. The command inputs associated with ordinary (manual) operation of a gamepad controller are depicted as switches in controller board signal 510, e.g., SW30, labeled as BTN_LEFT, corresponds to pressing a left button on the gamepad. Each switch may correspond to a command to control a connected robot. Each switch has two connection points, labeled as a 1-side input and a 2-side input. When a circuit is closed between the 1-side input and the 2-side input—such as when a gamepad button is pressed, closing the associated switch—the gamepad controller board 400 detects the input and produces an output signal that is recognized by a robot as a command. In short, controller board 400 transmits a command to a connected robot to do a particular task when a switch is closed. Each switch has a test point node, e.g., TP 30, which may be used to test the electrically coupled signal. By providing strategically selected electrical connections from various test points on gamepad controller board 400 to other electric circuits, the inventors have discovered a way to provide an alternative input mechanism for controlling a robot without requiring substantial rework or reprogramming of the robot's existing communications technology. One critical consideration in connecting the switch circuitry on gamepad controller board 400 to other electrical circuits is the arrangement of shared electrical contacts, as partially shown in FIG. 5. For example, the 1-side of SW30 BTN_LEFT is electrically connected to the 1-side of various other switches, including SW47 BTN_MODE and SW43 BTN_B.

FIG. 5 shows that for selected switches, the 1-side and the 2-side may be electrically connected to a controller board DB15_female 514 connector. The controller board DB15_female 514 connector receives the foot-operated controller DB15_male 521 connector. A signal generated by foot-operated controller 101 may close a switch on foot-operated controller signal 520. Both sides of an active switch located on foot-operated controller signal 520 may be electrically coupled to DB15_male 521 connector. FIG. 5 illustrates a circuit path that a signal from foot-operated controller 101 may take via interface circuit 500 to controller board 400.

In one embodiment, a user may step on foot-operated controller pressure tile 374, compressing thick foam layer 333, causing an underlying pressure sensor 392 to contact electrical wires 391, closing a switch SW4 SW_LEFT 15,12 523, and generating a signal. The signal, generated by foot-operated controller 101, may propagate to foot-operated controller DB15_male 521 connector pin numbers 12 and 15 which may be electrically coupled to controller board DB15_female connector 514 pin numbers 12 and 15. Controller board DB15_female connector 514 pin numbers 12 and 15 may electrically couple to the 1- and 2-sides of controller board BTN_LEFT 20 switch 524, thereby commanding a connected robot to turn left. Each active foot-operated controller pressure tile 370 may generate a corresponding connection between the 1- and 2-sides of a switch on controller board signal 510, triggering the sending of a command to a connected robot.

FIG. 5 also shows the use of shared electrical rails or contacts in the circuitry of foot-operated controller signal 520. For example, the SW4 SW_LEFT switch has its 1-side connected to the 1-side of SW3 SW_DOWN. This electrical partial-tethering of the connections between SW3 and SW4 necessitates that both of these pressure tiles be mapped to a pair of switches in controller board signal 510 that have a similar electrical arrangement. As explained previously, SW4 SW_LEFT is mapped to pins 12 and 15 on the DB15 connectors, and from there to SW30 BTN_LEFT in controller board signal 510. SW3 SW_DOWN connects to pins 13 and 15 on the DB15 connectors, and from there to SW43 BTN_B in controller board signal 510. As noted previously, SW30 BTN_LEFT and SW43 BTN_B share a common 1-side electrical connection, specifically, to pin 15 of the DB15 connectors. Similar electrical connections and mappings are made between foot-operated controller signal 520 and controller board signal 510.

Figure 6A:
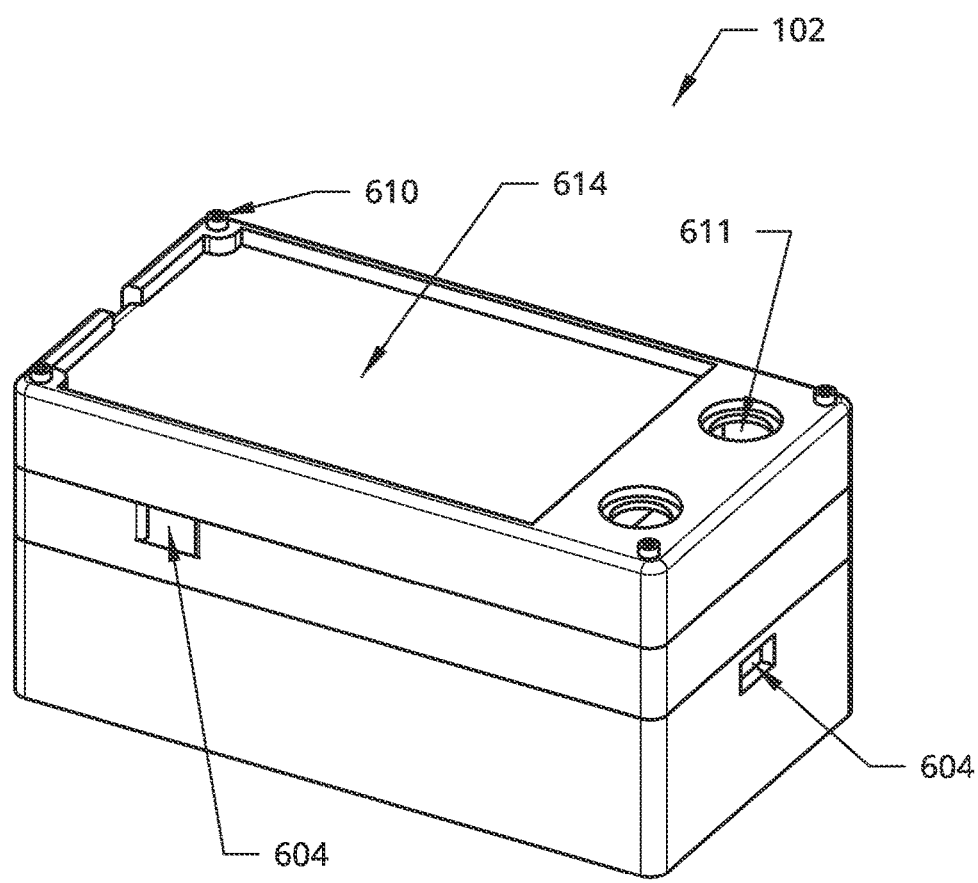
FIG. 6A is a side view of an illustrative control box.
Figure 6B:
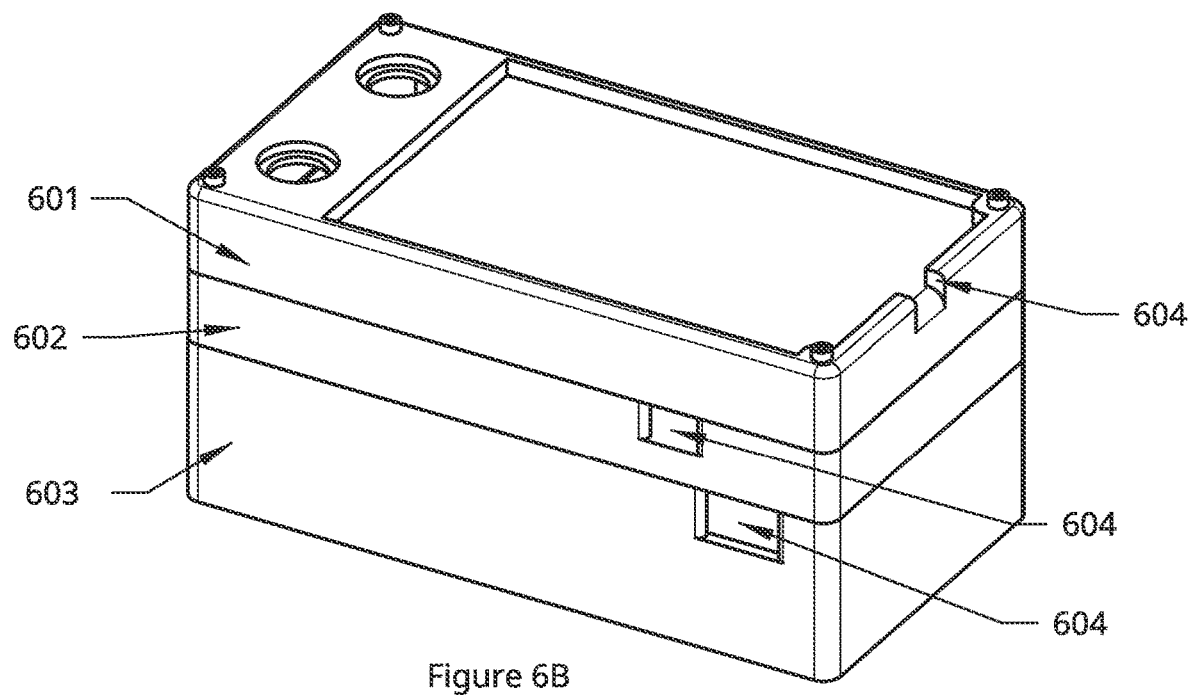
FIG. 6B is another side view of an illustrative control box.

FIGS. 6A and 6B illustrate a perspective view of controller box 102 containing a top 601, a middle 602, a bottom 603, and a plurality of openings 604. Openings 604 may provide electrical access to circuitry within the controller box 102. Controller box 102 may be designed to hold circuitry and other components to facilitate communication between foot-operated controller 101 and a connected robot. Top 601 includes a tray 614 to house a smartphone, a plurality of screws 610, and a plurality of buttons 611.

Figure 6C:
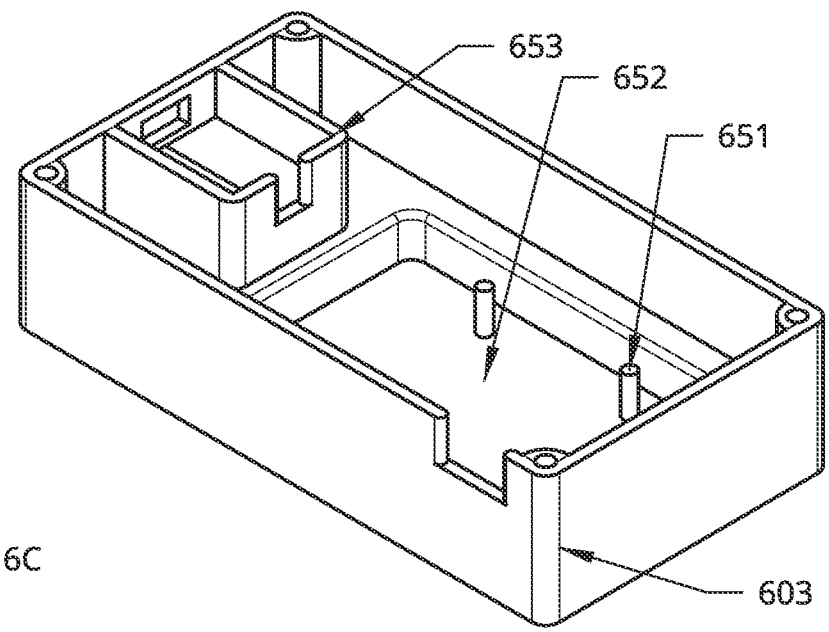
FIG. 6C is a perspective view of a bottom of an illustrative control box.

FIG. 6C illustrates a perspective view of controller box bottom 603 which includes a tray 652 to house controller board 400, which may be held in place with a set of pegs 651. Additionally, bottom 603 may have a DB15 cable port 653 to connect foot-operated controller 101 DB15_MALE 521 connector to controller board 400 DB15_FEMALE 514 connector.

Figure 6D:
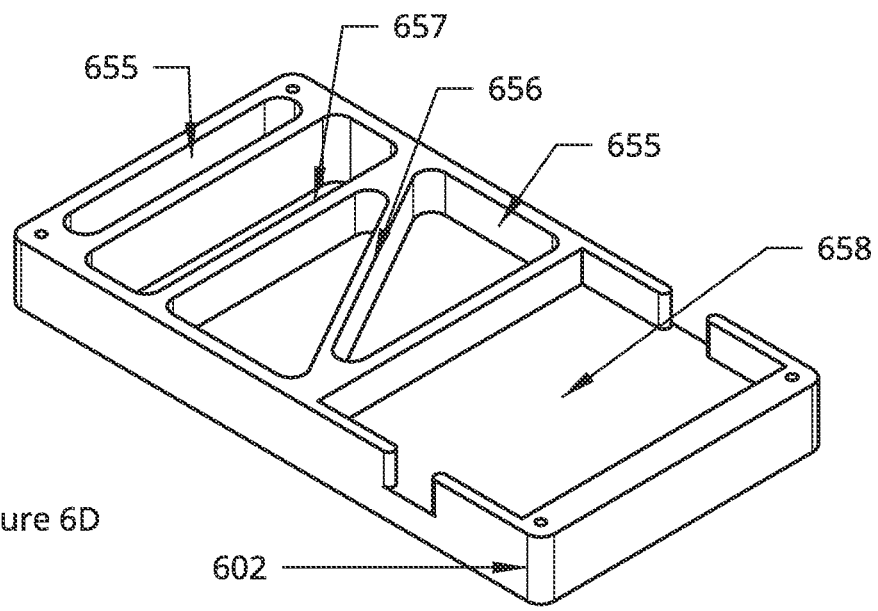
FIG. 6D is a perspective view of a middle of an illustrative control box.

FIG. 6D illustrates a perspective view of controller box middle 602 containing an opening 658 for USB OTG Hub (not shown), which may be used for communication with a connected robot. Middle 602 may also include a crossbar 656 to maintain the structural integrity of controller box 102. Middle 602 may include one or more openings such as 657 and 655 to reduce the weight of controller box 102.

Figure 6E:
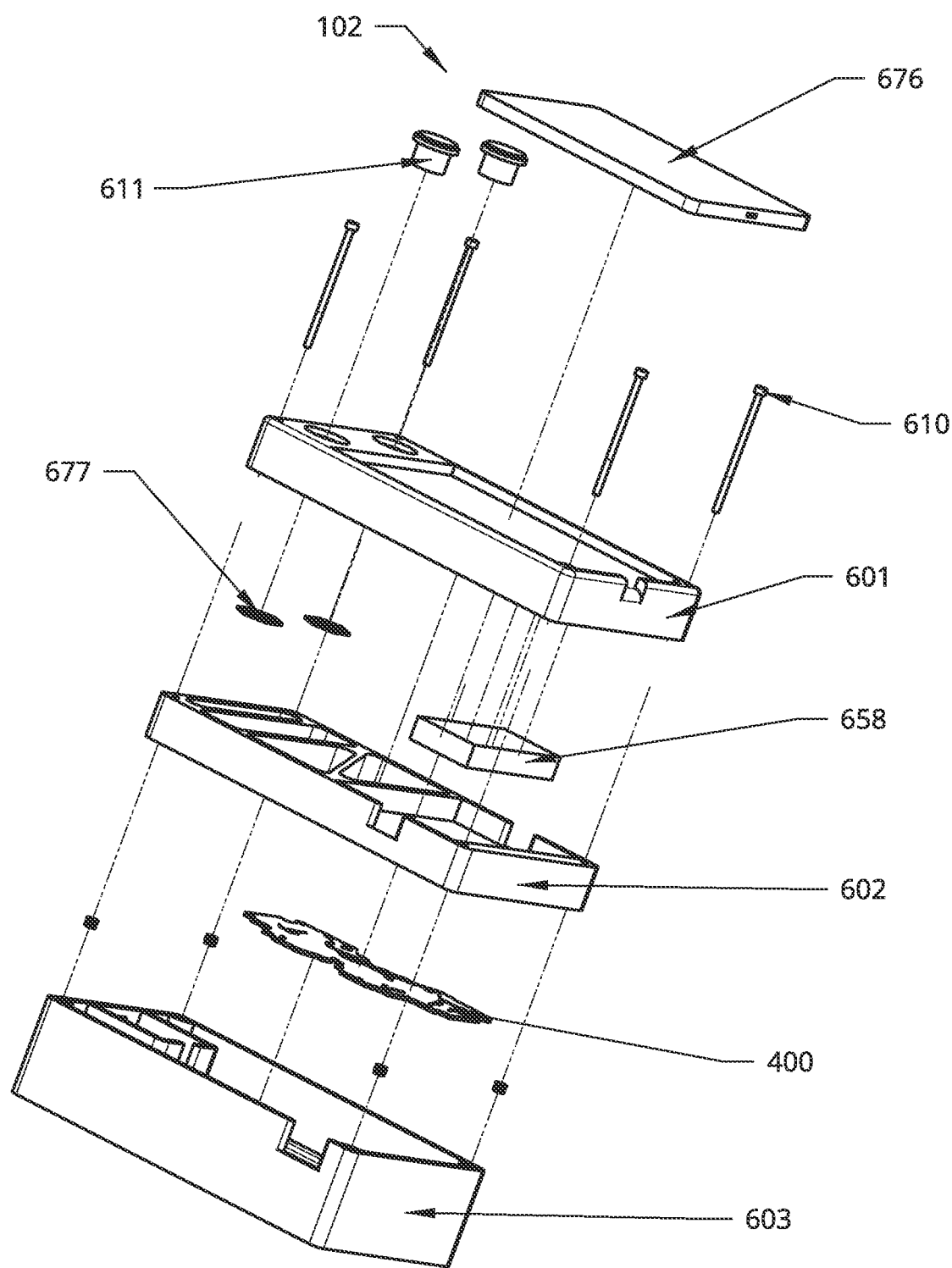
FIG. 6E is an exploded view of an illustrative control box.

FIG. 6E illustrates an exploded view of controller box 102. Bottom 603 houses controller board 400. Next, middle 602 may include USB OTG hub 658, and electrical contacts 677 for buttons 611. Top 601 contains buttons 611 used for initialization of the system, tray 614 to house a smartphone 676, and a plurality of screws 610.

Figure 7A:
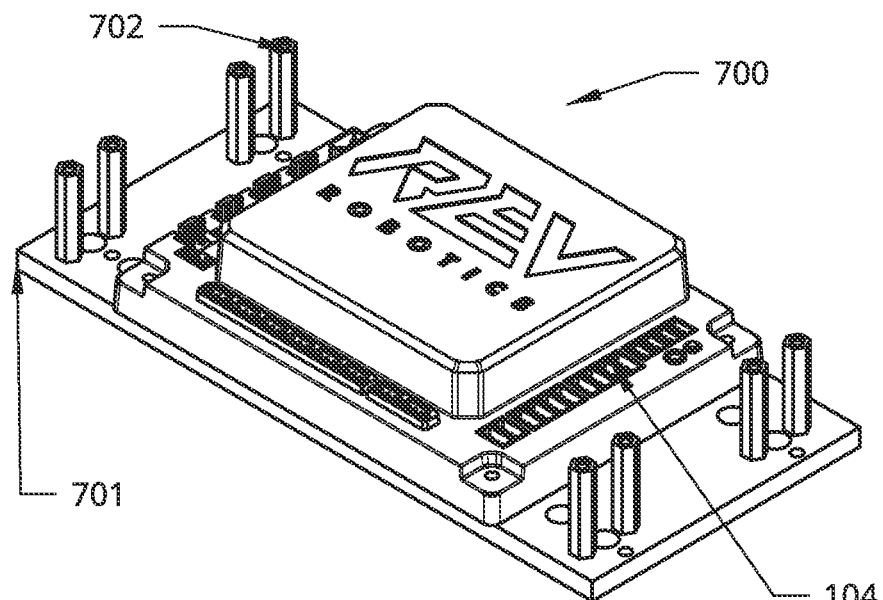
FIG. 7A is a top view of a control hub attached to a base plate.
Figure 7B:
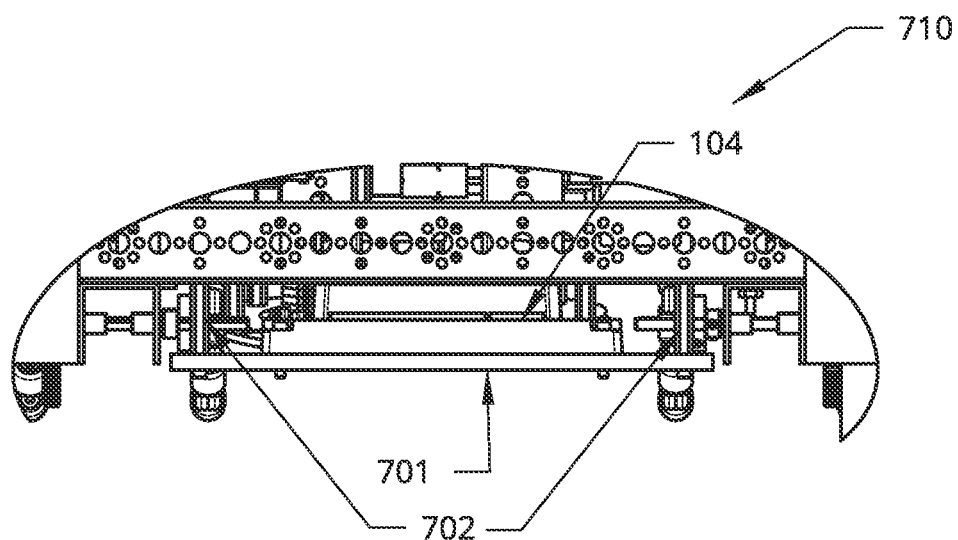
FIG. 7B is a perspective view of a control hub attached to a robot.

A robot may be equipped with a robot control hub system 700 for controlling its operation. FIG. 7A illustrates robot control hub 104 rigidly attached to a plate 701 with a plurality of standoffs 702 attached to a top surface of plate 701. FIG. 7B illustrates robot control hub system installed 710 and rigidly attached to an anterior surface of a robot frame using a plurality of standoffs 702.

Figure 8:
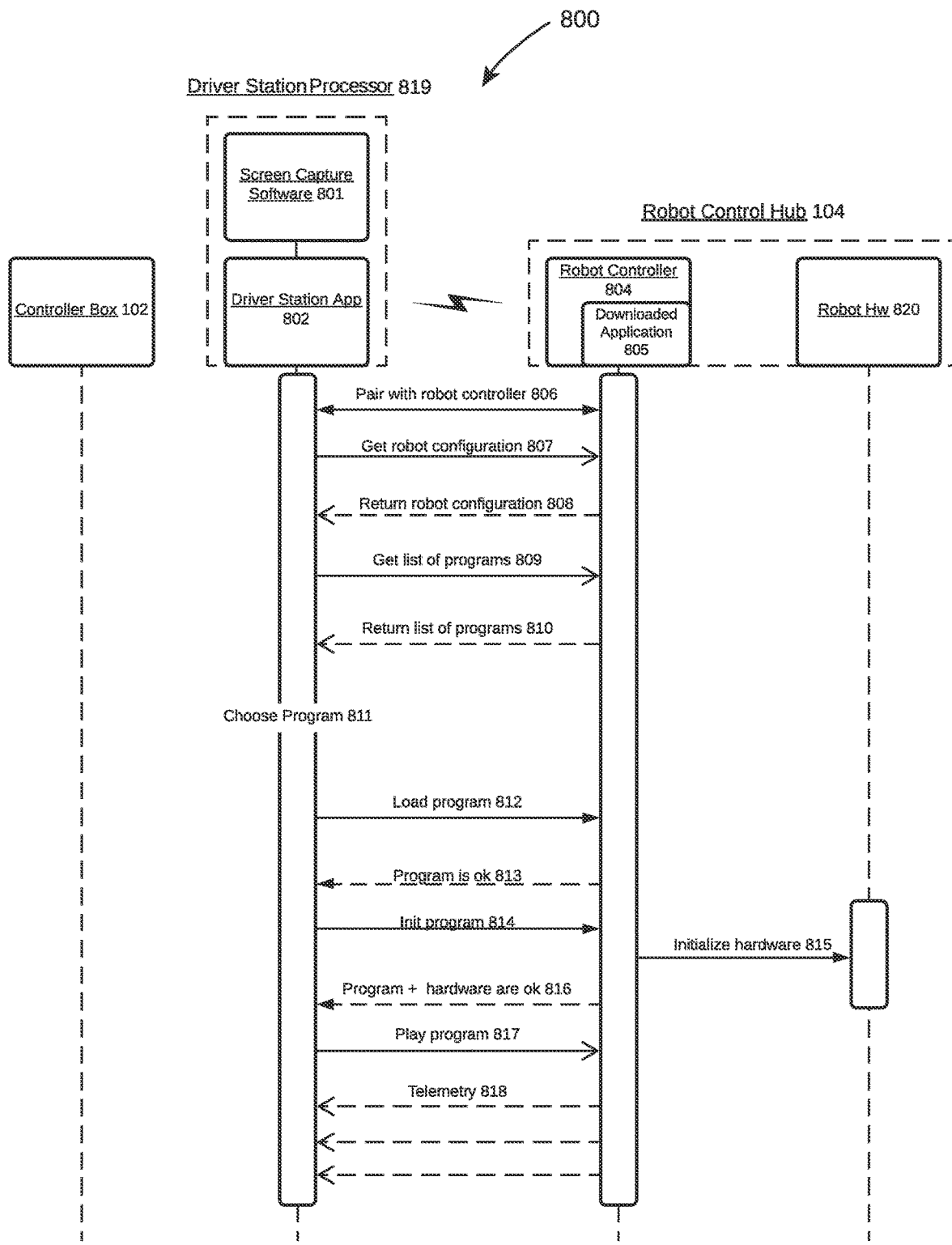
FIG. 8 is a process flow diagram of a manual user function's basic integration message sequence for a foot-operated robot system.

FIG. 8 illustrates robot control hub 104 that may include various hardware and software components, e.g., a robot controller 804 and a downloaded application 805, to control the attached robot. Robot control hub 104 preferably includes a programmable processor with computer-readable memory storing instructions executable by the processor. Robot control hub 104 may include an interface for receiving instructions for controlling an associated robot from a driver station processor 819. The driver station processor 819 may be a desktop, personal computer, or other general purpose computer, and in a preferred embodiment, the driver station processor is a smartphone or PDA. A driver station processor may be with a driver station application. Driver station processor 819 communicates via an interface that may include a wired or wireless connection. Driver station processor 819 communicates via the interface with robot control hub 104 mounted on a robotic vehicle. Robot control hub 104 includes a robot controller 804 and a downloaded application 805. Driver station processor 819 may receive commands from controller box 102 and may transmit commands via an interface to robot controller 804 and downloaded application 805. The interface may use proprietary or standards-based communications technology, including for example a Universal Serial Bus (USB), Bluetooth, or IEEE 802.11-2020 interface. The interface is preferably a wireless interface that operates in an unlicensed radio frequency band of the electromagnetic spectrum, such as 2.4 Ghz or 5 Ghz. In this manner, the associated robot may be remotely controlled through a wired or wireless connection. When instructions are received through the interface, a filter may be applied to evaluate whether to execute a received command. For example, a threshold filter may prevent initiating movement in response to a noise produced by the source of the instructions. As another example, robot control hub 104 may evaluate a received command in the context of the robot's location, situation, or both, and may disregard a command that is deemed to be unsafe or that may damage the robot. Evaluating the propriety of a received command may include analyzing the command in the context of other input data, such as visual information from a locally mounted camera.

FIG. 8 illustrates a manual user function's basic initialization message sequence 800 for foot-operated robot control system 100. In one embodiment, driver station processor 819, which may be stored on a smartphone, may contain one or more applications, e.g., a screen capture software 801 and a driver station application 802. Method 800 begins with driver station application 802, stored in driver station processor 819, initiating wireless communication with robot control hub 104 by pairing with a downloaded application 805 at step 806. At steps 807 and 808, driver station processor 819 requests, and robot control hub 104 returns, the connected robot configuration. At step 809, driver station processor 819 requests a list of programs which robot control hub 104 returns in step 810. At step 811, a program is selected at driver station processor 819 (for example, by a human user choosing from a displayed list). Driver station processor 819 then requests that robot control hub 104 load the program at step 812. At step 813, robot control hub 104 responds to driver station processor 819 with the status of the loaded program, e.g., the program is ok. Driver station processor 819 sends the instruction to robot controller 804 to initialize a program at step 814. Robot hardware 820 is initialized at step 815 by robot controller 804. After connected robot's hardware 820 initialization, robot control hub 104 returns a status message to driver station processor 819, e.g., program and hardware are ok at step 816. Driver station processor 819 then sends an instruction to execute the loaded program at step 817. While the connected robot is executing the selected program, at step 818, telemetry messages concerning the connected robot are sent to driver station processor 819 periodically.

Figure 9:
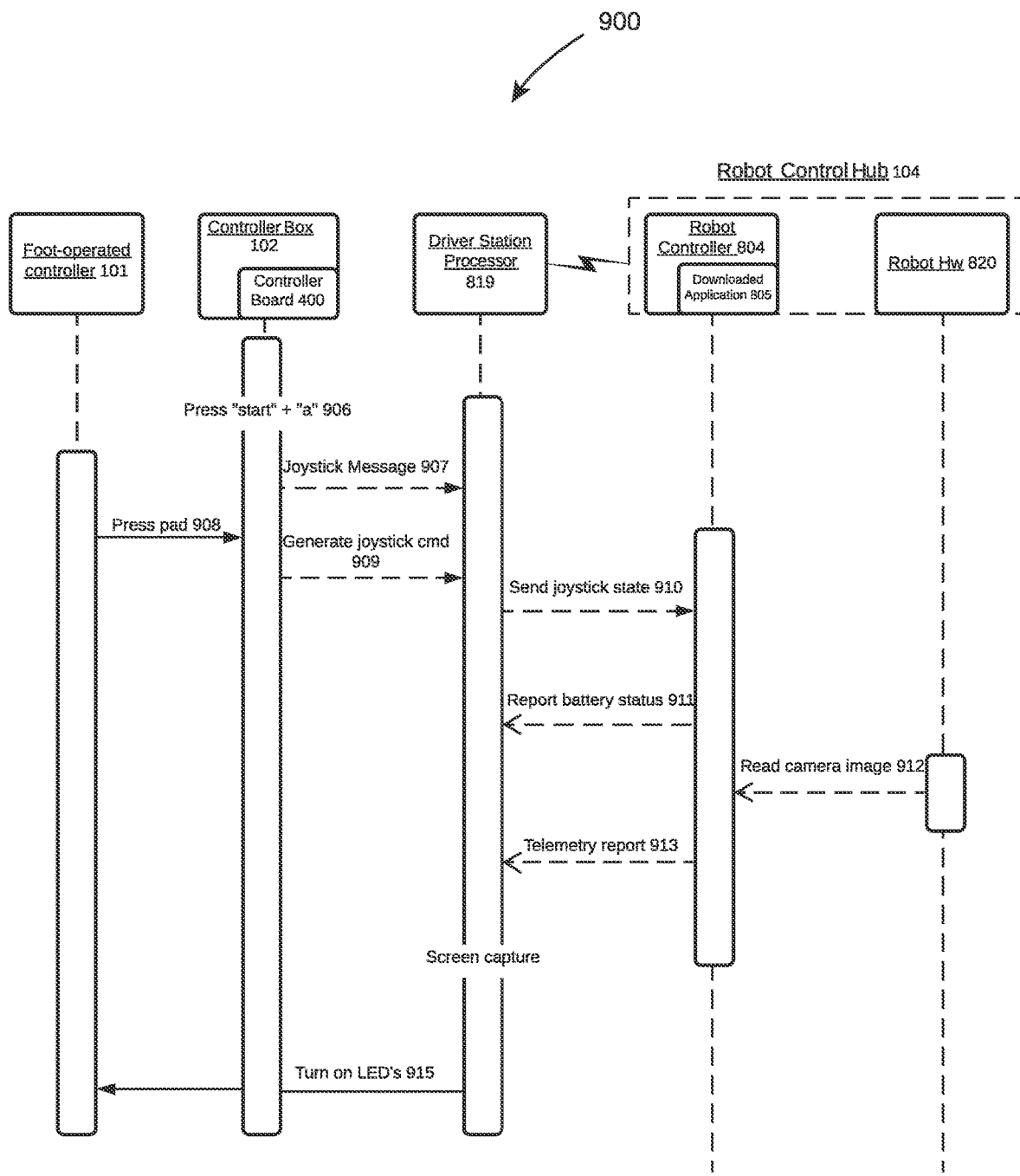
FIG. 9 is a process flow diagram of a control command message sequence for a foot-operated robot system.

After the connected robot is initialized, FIG. 9 illustrates control command message sequence 900 to control the connected robot using foot-operated controller 101. Driver station processor 819 may be in wireless communication with downloaded application 805 executing on robot controller 804. In some embodiments, a start-up sequence may be required to activate or initialize one or more components. For example, at step 906 a human user may press the "start" and "a" buttons on game controller 103. This command is sent to controller box 102 to initialize the system prior to a user stepping on foot-operated controller 101. After initialization, controller board 400 sends a joystick message to driver station processor 819 at step 907. Step 908, when a user steps on foot-operated controller 101, the output signal from foot-operated controller 101 travels to controller board 400 which is housed in controller box 102. As previously discussed with respect to FIG. 5, the signal from foot-operated controller 101 closes a circuit associated with switch on controller board 400, thereby triggering the transmission of an associated joystick command to driver station processor 819 at step 909. Driver station processor 819, at step 910, sends a joystick state message to robot controller 804, which may then activate robot hardware to execute a maneuver (not shown).

In some embodiments, two-way communication between a robot and a driver station processor 819 or a foot-operated controller 101 may be provided. For example, robot controller 804 may send a battery status to driver station processor 819 at step 911; information about the robot's battery status may then be displayed on a screen of driver station processor 819. Information about the status of the robot may be provided to foot-operated controller 101 (and potentially displayed using LED or other visual outputs on foot-operated controller 101) as follows. Robot hardware 819 sends a read camera image to robot controller 804 at step 912. Robot controller 804 receives the read camera image from robot hardware 820 and transmits a robot telemetry report at step 913 to driver station processor 819. At step 914, driver station processor 819 takes a screen capture of all data sent to it from robot controller 804. Lastly, at step 915, driver station processor 819 sends a command back to foot-operated controller 101 which turns on certain LED lights located on foot-operated controller 101. In one embodiment, such visual feedback to foot-operated controller 101 is provided when image analysis software executing on robot controller 804 detects that an appropriate target is within view of a camera on the robot; thus, a user with limited visual sightlines to the robot—and without access to driver station processor 819—may be informed when it is possible or advantageous to provide certain commands to the robot, for example, to launch a ring toward a desired target.

Figure 10:
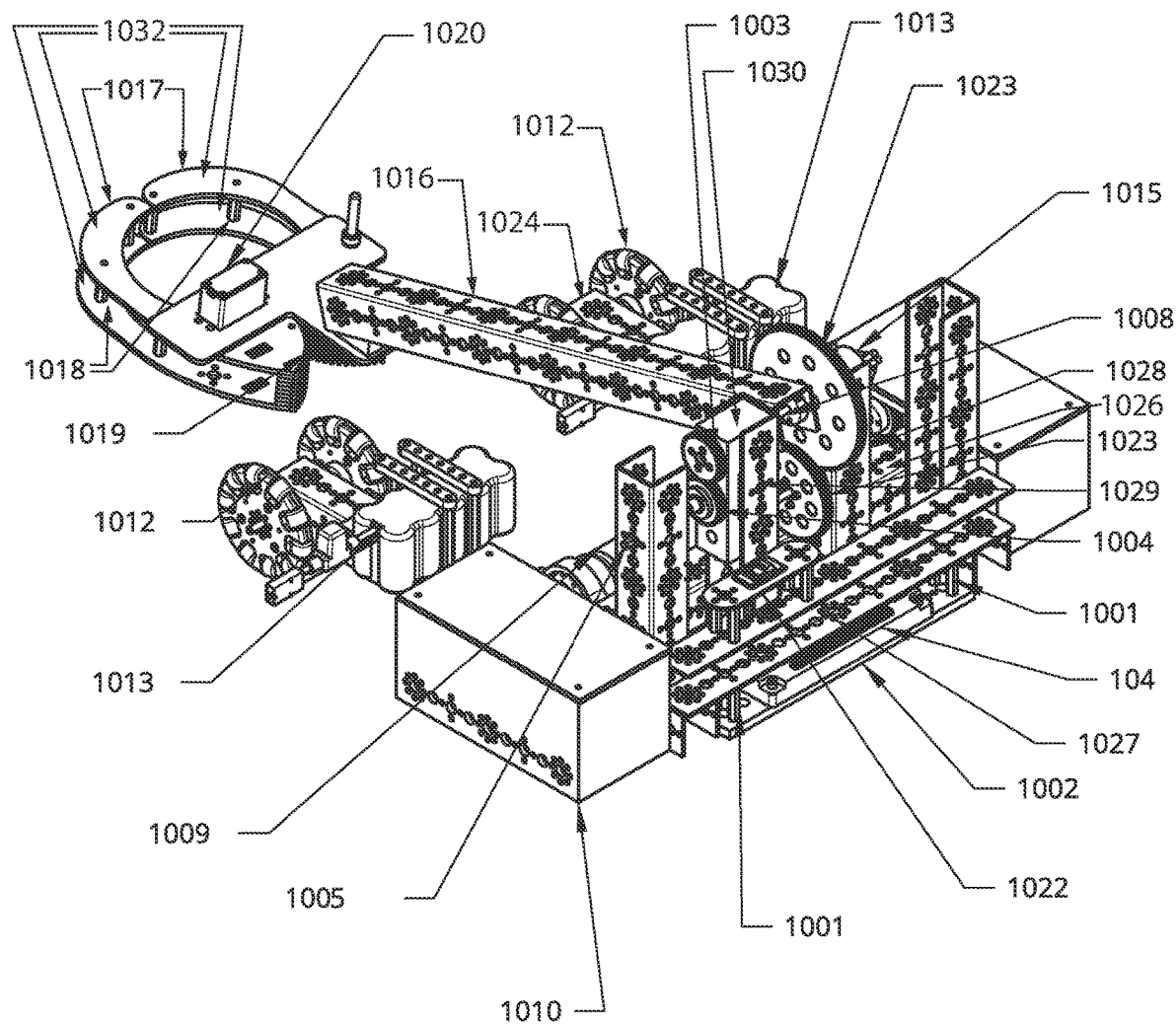
FIG. 10 is a perspective view of a clawbot.

FIG. 10 illustrates a perspective view of a clawbot which is an example of a connected robot. A clawbot is a robotic vehicle that may be designed to communicate with driver station processor 819, travel to an object, pick up, raise, lower, or release the object using a claw arm 1016 and a claw 1017.

A clawbot has a frame, including a rear support beam 1027 and a forward support beam 1026. In some embodiments, the beams may be Tetrix channel brackets, commercially available from Pitsco Education, LLC of Pittsburg, KS The forward support beam 1026 and rear support beam 1027 support a variety of additional components, e.g., claw arm 1016 and a plurality of claw fingers 1032. Arm channel brackets 1028 arise from and are rigidly attached to rear support beam 1027 and terminate at forward support beam 1026. A power on/off switch 1022 is mounted to a top surface of rear support beam 1027.

In some embodiments, a clawbot may be capable of driving over varied terrain via a plurality of omniwheels 1012 powered by a wheel motor 1009 (or multiple such wheel motors). In some embodiments, wheels of a different type may be employed, for example, some or all wheels may be treaded wheels. More information on the design and use of treaded wheels is provided in U.S. Pat. No. 9,211,922 to Keeling, et al., entitled "Robotic vehicle having traction and mobility-enhanced wheel structures," the contents of which is hereby incorporated by reference for all purposes. The rear wheels are enclosed in a 3-d printed rectangular box 1010. A set of wheel channel brackets 1024 are rigidly attached perpendicularly to forward support beam 1026 with wheels 1012 attached to each side. A battery pack 1013 is affixed to a top surface of each wheel channel bracket 1024. In some embodiments, a clawbot may be operable with only one battery pack 1013, however, it may be desirable to nevertheless provide a second battery pack 1013 as a counterweight for improved traction and stability.

Robot control hub 104 controls the attached robot and may be in wireless communication with driver station processor 819. Robot control hub 104 is attached to a top surface of plate 1002. Plate 1002 is rigidly attached to the underside of rear support beam 1027, such as with screws, through a plurality of standoffs 1001. Standoffs 1001 are preferably relatively short so that plate 1002 does not touch the ground. However, standoffs 1001 should nevertheless allow space for electrical connections, airflow ventilation, etc., between robot control hub 104 and rear support beam 1027.

The claw arm 1016 enables a clawbot to raise and lower an object. Claw arm 1016 is powered by a motor 1015 which is rigidly attached to an arm channel bracket 1028. Motor 1015 shaft (not shown) drives a gear (not shown) which meshes with a larger gear 1023, transmitting motion to it. Gear 1023 drives bar 1008 and transmits motion to claw arm 1016. As will be discussed further below, to protect claw arm 1016, the potentiometer 1030 is used to monitor claw arm's 1016 position in space so that the angle of rotation does not exceed a threshold limit. Thus, the claw arm 1016 may be electronically prevented from possibly striking the floor and causing damage. The maximum lift angle of claw arm 1016 may also be limited. A potentiometer channel bracket 1029 arises from and is rigidly attached to rear support beam 1027. A potentiometer shaft 1005 extends from a potentiometer channel bracket 1029, through potentiometer gear 1004, and terminates as input to potentiometer 1030.

A clawbot picks up and releases objects using a claw 1017 attached to the end of claw arm 1016. Claw 1017 includes two claw fingers 1032, each of which comprises a set of two plates, separated by standoffs 1018, with a set of geared teeth 1019 to synchronize the movement of the claw fingers 1032 with each other. A claw servo motor 1020 is affixed to a top surface of one claw finger 1032 and powers claw 1017 enabling claw fingers 1032 to open and close. Further information about the design and use of claw 1017 is available in U.S. Pat. No. 10,384,338 to Greene, et al., entitled "Robotic vehicle having extendable mandible structure," the contents of which is hereby incorporated by reference for all purposes.

FIG. 11 shows various aspects of claw arm potentiometer system 1100. FIG. 11A illustrates the connections to and from potentiometer 1030, which is illustrated as residing partly within a Tetrix channel bracket 1031. In some embodiments, potentiometer 1030 may provide data about the actual position of claw arm 1016. Potentiometer 1030 may be coupled to a potentiometer mount 1103, which in turn is coupled to arm/potentiometer channel bracket 1029, and potentiometer input shaft 1005. Potentiometer channel bracket 1029 and shaft bushing 1102 provide support for input shaft 1005 and reduces stress on potentiometer 1030. Input shaft 1005 is physically coupled to gear 1004 and mechanically coupled to claw arm motor shaft 1008 through gear 1003.

FIG. 11B is a front view of potentiometer mount 1110 towards input shaft 1005. Input shaft 1005 is coupled to potentiometer 1030 through an aperture 1112. Potentiometer 1030 electrical connections, power and ground, may be coupled to potentiometer 1030 through apertures 1111 and 1113.

FIG. 11C is a perspective view of potentiometer mount 1103. Potentiometer mount 1103 provides a structural interface between a Tetrix channel bracket (such as Tetrix channel bracket 1029 in FIGS. 10 and 11) and potentiometer 1030. Potentiometer 1030 may be coupled to potentiometer mount 1103 using one or more screws in accordance with a hole pattern 1123. The potentiometer mount 1103 may be coupled via one or more screws to arm/potentiometer channel bracket 1029 (see FIGS. 10 and 11) using Tetrix hole pattern 1105. Power for potentiometer 1030 may be provided through wiring that passes through a feedthrough channel 1122.

Figure 12:
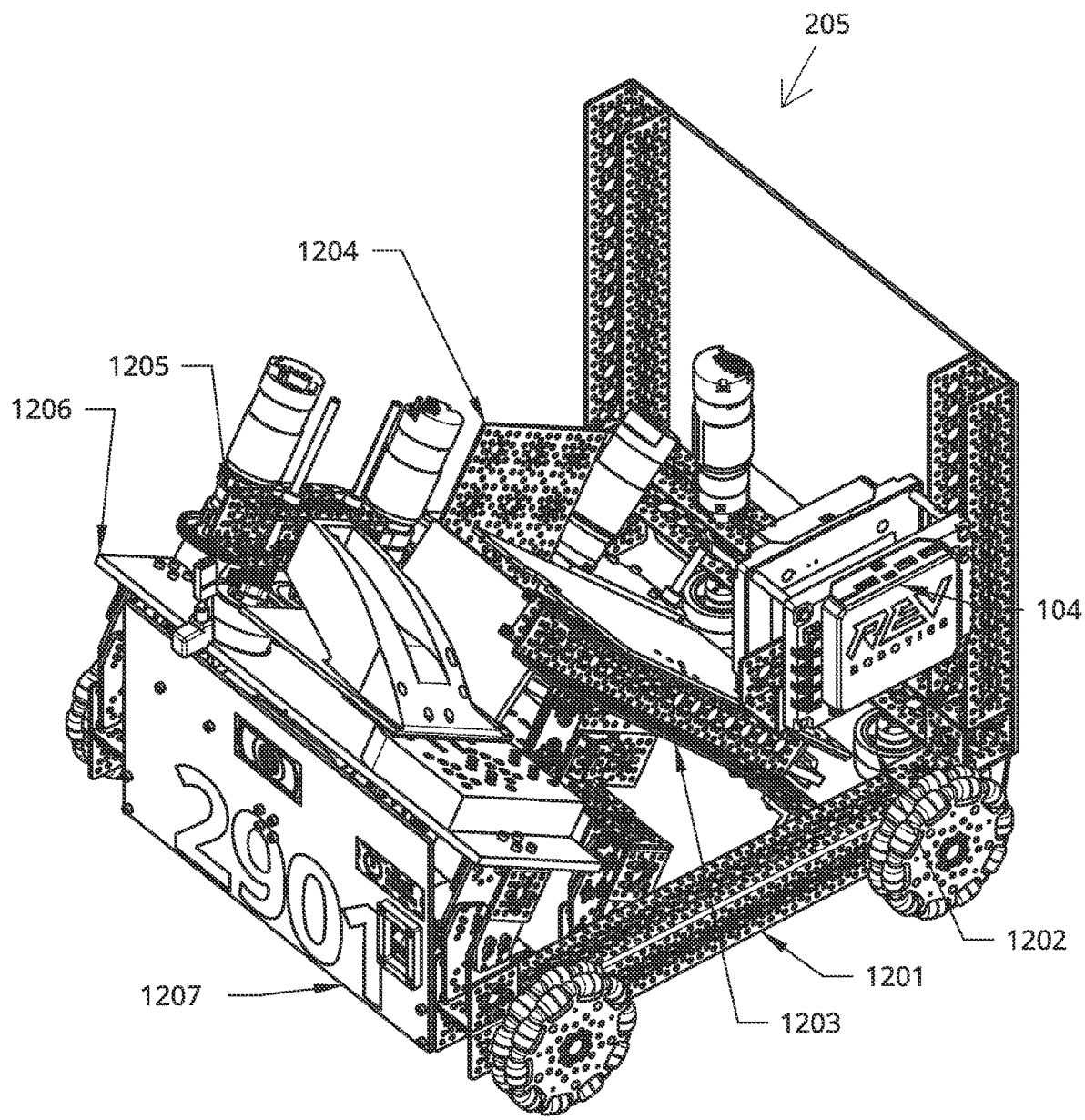
FIG. 12 is a perspective view of a launcherbot.

Turning now to FIG. 12, illustrated is a launcherbot which may by controlled using robot control system 100 discussed above. A launcherbot includes robot control hub 104, a drive base system 1201, a ring intake system 1202, a ring transfer system 1203, a ring stacker system 1204, a flywheel driver system 1205, a ring launcher system 1206, and a camera system 1207.

Figure 13A:
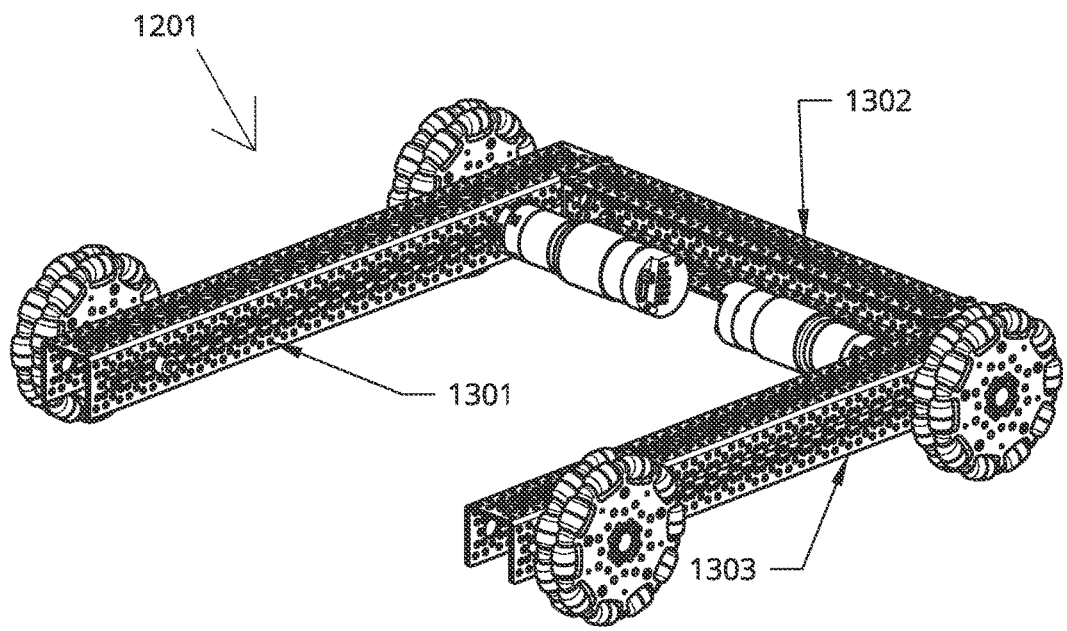
FIG. 13A is a perspective view of a launcherbot drive base system.

The drive base system 1201 is further illustrated on FIG. 13A. Drive base system 1201 includes a crossbar 1302. Attached at a right angle to either end of crossbar 1302 are two side bars 1301, 1303, which are symmetric about a central axis of drive base 1201. Crossbar 1302 and side bars 1301, 1303 are preferably actobotics channel brackets.

Figure 13B:
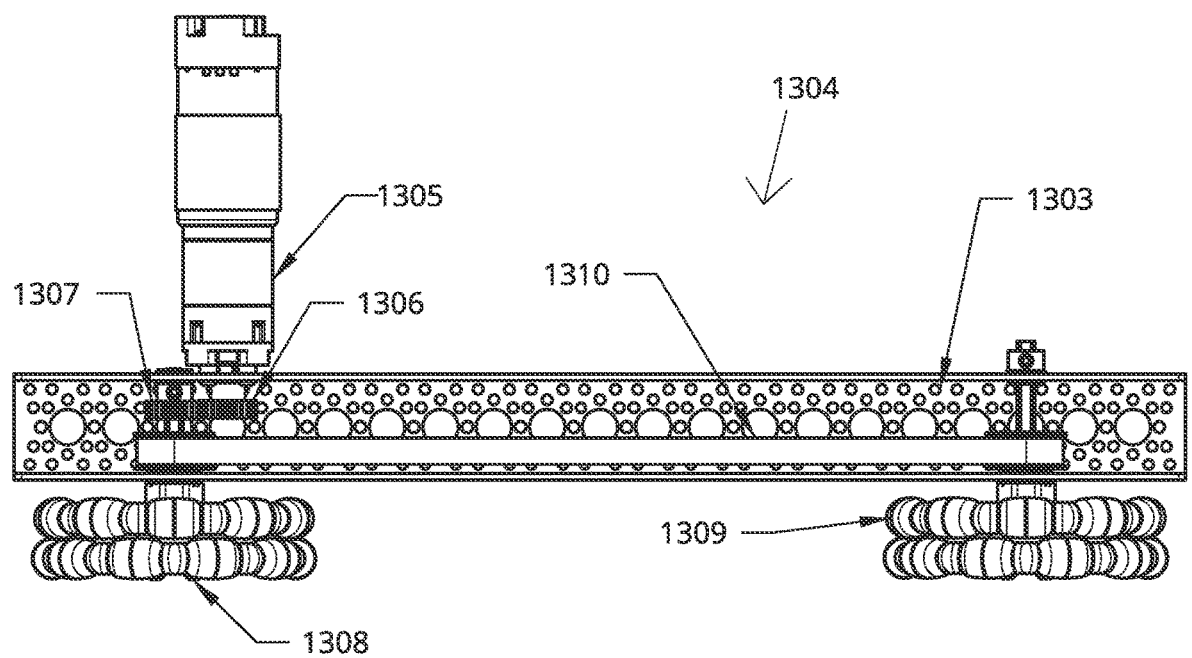
FIG. 13B is a bottom view of a side bar assembly for a laucherbot drive base system.

FIG. 13B provides a detailed illustration of a bottom view of a side bar assembly 1304 including side bar 1303. Side bar 1301 is similarly part of another side bar assembly (not shown) that is symmetric to that shown in FIG. 13B. Side bar assembly 1304 includes a motor 1305 attached to a posterior lateral surface of side bar 1303. A shaft of motor 1305 extends through an aperture in side bar 1303 and drives a gear 1306. Gear 1306 meshes with one or more gears 1307 to drive an output shaft coupled to an omni wheel 1308. Side bar 1303 includes another omni wheel 1309 at the other extremis. Omni wheel 1309 is mounted to side bar 1303 via a shaft that extends through one or more apertures of side bar 1303.

Sidebar assembly may be equipped with a dual drive system. As illustrated in FIG. 13B, omni wheel 1309 may be connected to omni wheel 1308 through a belt 1310 preferably located in an interior channel of side bar 1303. In other embodiments, any suitable mechanism may be used to transfer power from motor 1305 to omni wheel 1309, such as a driveshaft or a series of gears. In some embodiments, omni wheels 1308, 1309 may be other types of wheels, such as treaded wheels or pneumatic wheels.

Figure 14:
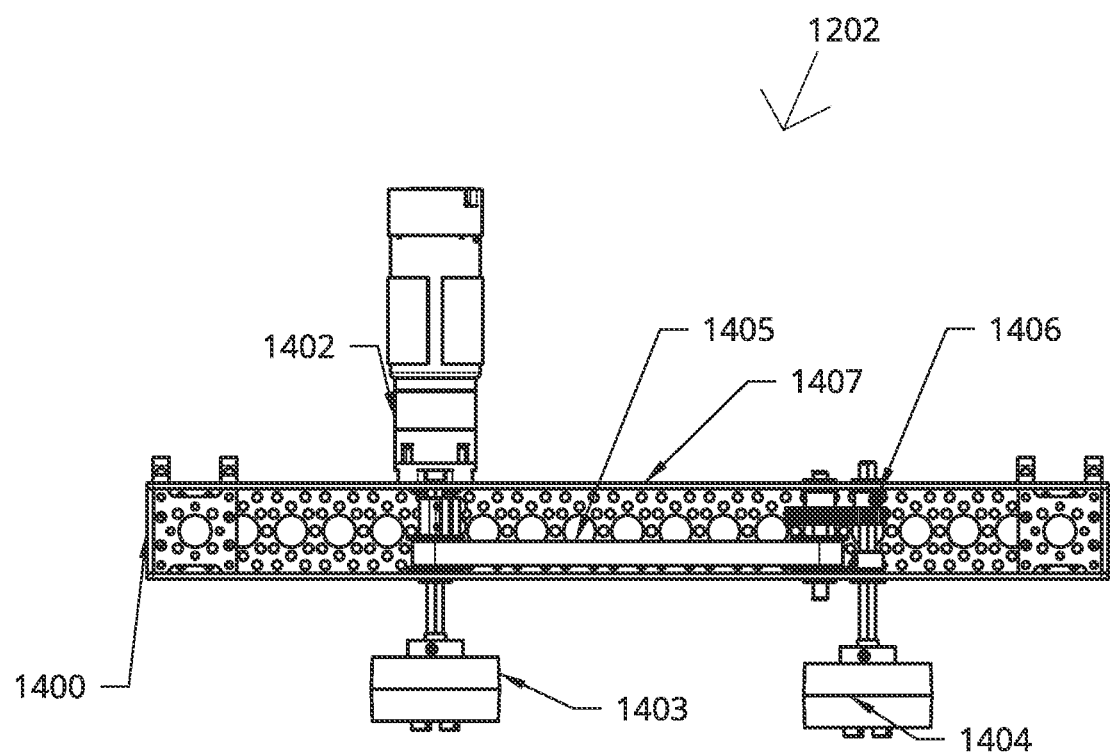
FIG. 14 is a side view of a ring intake system.

FIG. 14 provides a rear view of ring intake system 1202 with a back bar assembly 1400 including a back bar 1407. Back bar assembly 1400 further includes a motor 1402 attached to a top surface of back bar 1407. A shaft of motor 1402 extends through an aperture in back bar 1407 and drives an output shaft coupled to a flywheel 1403. Back bar assembly 1400 includes a second flywheel 1404 spaced apart from flywheel 1403. Flywheel 1404 is mounted to back bar 1407 via a shaft that extends through one or more apertures of back bar 1407. The distance between flywheels 1403 and 1404 (as measured between their outer circumferences) may be approximately the same as, or slightly less than, the width of a deformable ring to be picked up by ring intake system 1202. In some embodiments, the distance may be up to 6 mm less than the width of the deformable ring.

Back bar assembly 1400 may be equipped with a dual drive system. As illustrated in FIG. 14, flywheel 1403 may be coupled to rotate in synchronism with flywheel 1404 through a belt 1405 and two or more gears 1406 preferably located in an interior channel of back bar 1407. With such an arrangement, flywheel 1404 may rotate at a similar speed but the opposite direction of flywheel 1403.

In operation, ring intake system 1202 may work as follows. A user may guide a launcherbot toward a deformable ring such that the deformable ring is located approximately between counter-rotating flywheels 1403,1404. When both flywheels 1403, 1404 make contact with the deformable ring, the flywheels 1403, 1404 may be caused to rotate and thereby urge the deformable ring into the space between the flywheels 1403, 1404, which may include compressing the deformable ring between counter-rotating flywheels 1403, 1404. The motion imparted to the deformable ring by the counter-rotating flywheels 1403, 1404 causes the deformable ring to be transferred to an interior space of a launcherbot.

Figure 15:
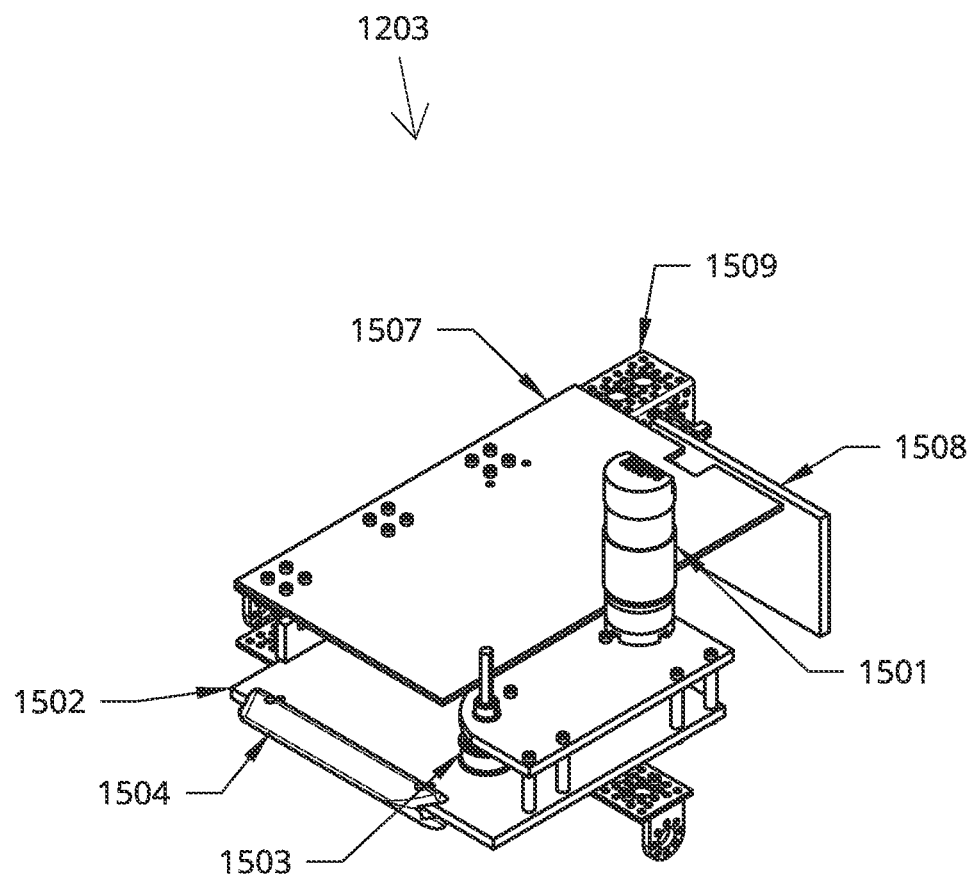
FIG. 15 is a perspective view of a ring transfer system.

FIG. 15 provides an illustration of ring transfer system 1203. Ring transfer system 1203 includes a ramp 1504 rigidly attached to an edge of a base plate 1502. Base plate 1502 is preferably sized to accommodate the width of a deformable ring. A motor 1501 is attached to a top surface of a top plate 1507. A shaft of motor 1501 extends through an aperture in top plate 1507 and drives a belt 1503. Across from belt 1503 is a compression bar 1509 which extends past base plate 1502. Compression bar 1509 is rigidly attached to a stopping plate 1508.

In operation, ring transfer system 1203 may receive a deformable ring from ring intake system 1202 via ramp 1504. The deformable ring may be urged forward by belt 1503 while base plate 1502, compression bar 1509, and top plate 1507 constrain the deformable ring. When the deformable ring reaches the end of base plate 1502, stopping plate 1508 may stop the forward motion and rotation of the deformable ring, and as a result, the deformable ring may drop to ring stacker system 1204 below.

Figure 16:
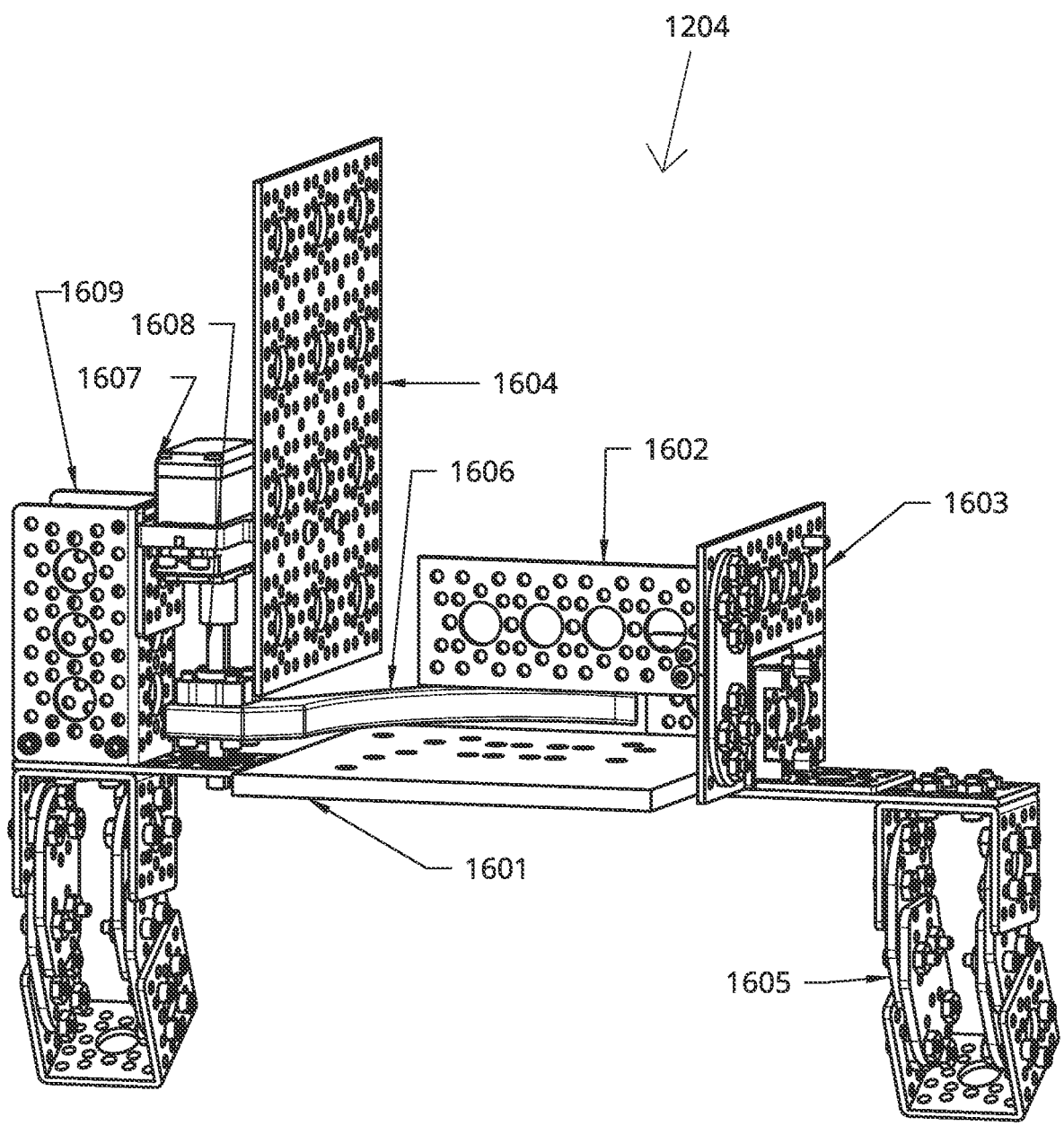
FIG. 16 is a perspective view of a ring stacker system.

FIG. 16 provides an illustration of ring stacker system 1204. Ring stacker system 1204 is mounted to side bars 1301 and 1303 preferably located on an anterior lateral surface of crossbar 1302 and beneath ring transfer system 1203. In operation, a deformable ring may drop from ring transfer system 1203 to ring stacker system 1204. The deformable ring may rest on a surface of a bottom plate 1601. The deformable ring may be constrained by a back plate 1602, a left plate 1603, and a right plate 1604. A plurality of deformable rings may stack, one on top of the other, on a top surface of bottom plate 1601. Bottom plate 1601 may be indirectly coupled to aiming arc plates 1605 which may be angularly adjustable such that the angle of bottom plate 1601 relative to other robot structures (and, for example, the ground) may be chosen or adjusted within a broad range. A channel bracket 1609 is attached to the aiming arc brackets 1605. A motor 1607 is attached to a top surface of the aiming arc brackets 1605. Ring stacker system 1203 includes a motor 1607 attached to channel bracket 1609, connected to an output shaft 1608, which drives a kicker 1606 and terminates through an aperture in bottom plate 1601. In operation, kicker 1606 may rotate about shaft 1608 to urge forward a deformable ring that was resting on bottom plate 1601. The kicker 1606 may urge a deformable ring toward ring launcher system 106.

Figure 17:
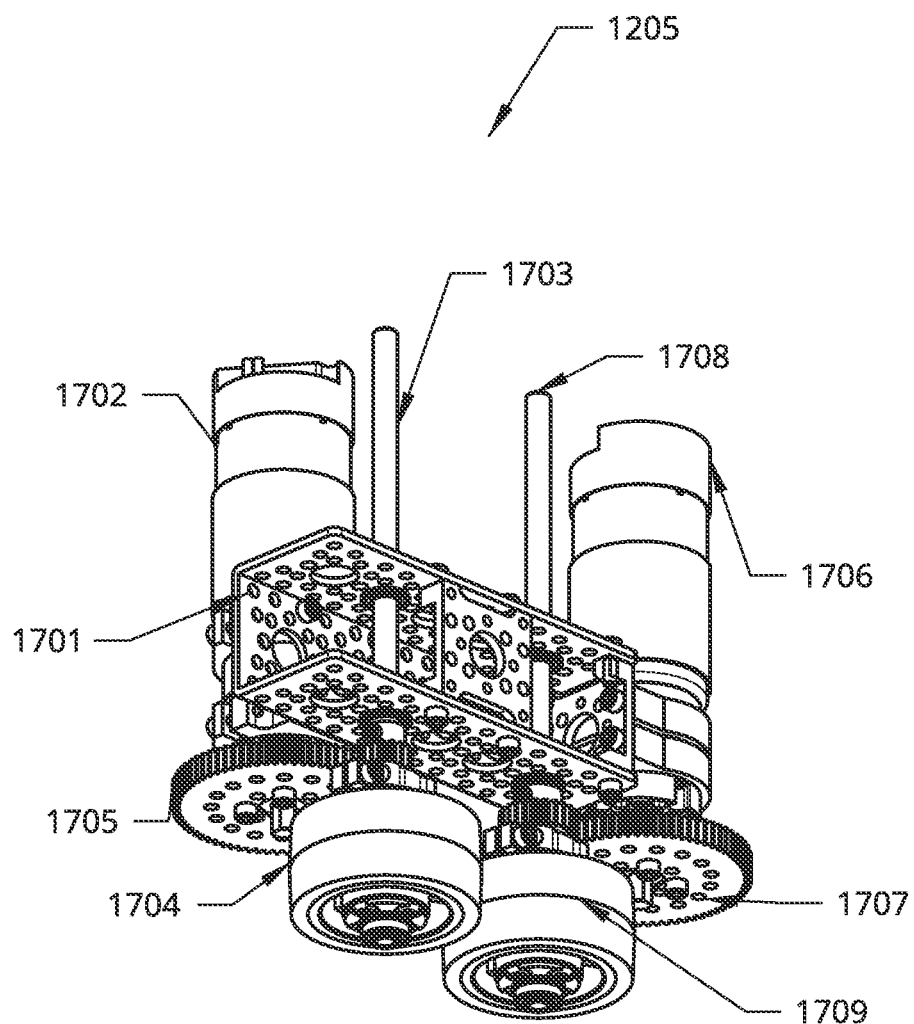
FIG. 17 is a side view of a flywheel driver system.

FIG. 17 provides an illustration of flywheel driver system 1205 comprised of a side bar 1701, two motors 1702, 1706, two shafts 1703, 1708, two flywheels 1704, 1709, and a plurality of gears. As discussed further below, flywheel driver system 1205 includes two motors 1702, 1706 mounted to a top surface of a baseplate 1801 of ring launcher system 1206. A shaft of motor 1702 drives an output shaft coupled to a gear 1705. Shaft 1703 is coupled to a gear and drives flywheel 1704. A shaft of motor 1706 drives an output shaft coupled to a gear 1707. Shaft 1708 is coupled to a gear and drives flywheel 1709. Motors 1702, 1706 may independently drive, at different speeds, flywheels 1705 and 1709 respectively.

Figure 18:
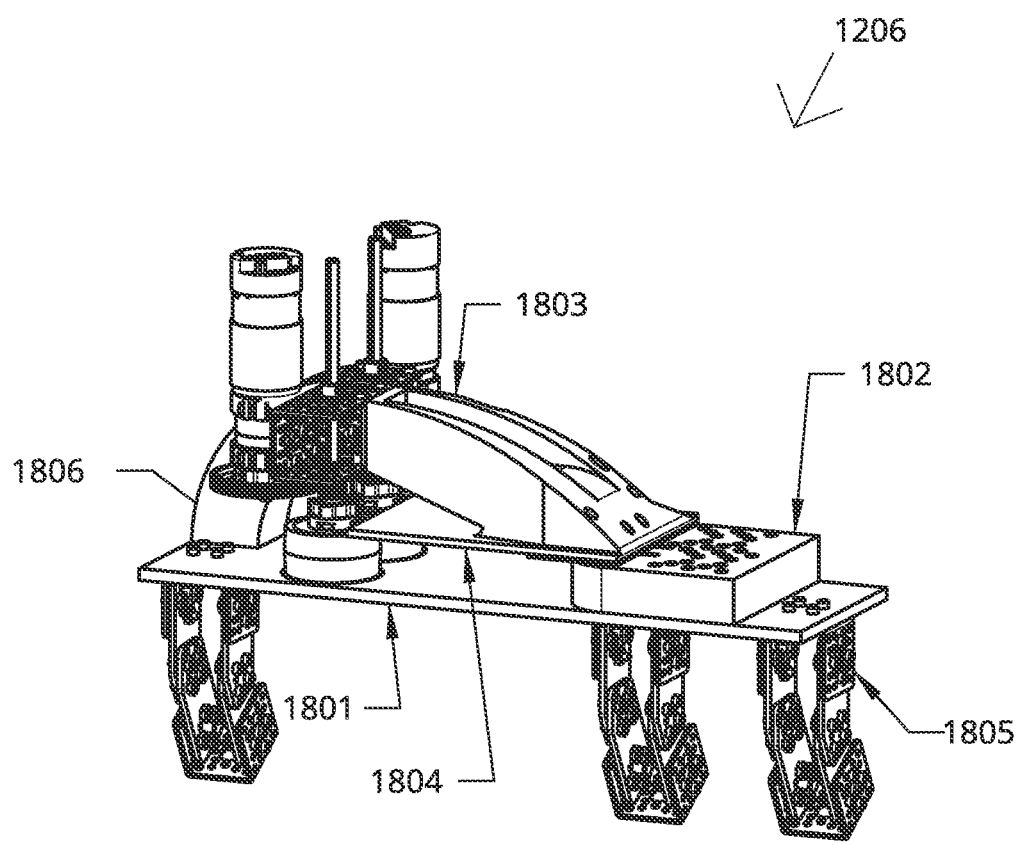
FIG. 18 is a perspective view of a ring launcher system.

FIG. 18 provides an illustration of ring launcher system 1206 comprised of a compression plate 1802, a middle bracket 1803, a base plate 1801, a back bracket 1806, a top plate 1804, and a plurality of aiming brackets 1805. Back bracket 1806, compression plate 1802, and flywheel driver system 1205 are attached to a top surface of base plate 1801. Back bracket 1806 provides structural support to flywheel driver system 1205. Middle bracket 1803 is rigidly attached to compression plate 1802 at one extremis and side bar 1701 of flywheel driver system 1205 at the other extremis. Aiming brackets 1805 are rigidly attached to an anterior surface of baseplate 1801. Aiming brackets 1805 may be adjusted to a selected angle so that an angle of base plate 1801, relative to other robot components and the ground, is as desired.

Launch of a deformable ring begins with kicker 1606 urging a deformable ring forward. Ring launcher system 1206 and flywheel driver system 1205 receive the deformable ring from ring stacker system 1204. Ring launcher system 1206 confines the deformable ring using top plate 1804, compression plate 1802, and base plate 1801. Flywheels 1704 and 1709 move the confined deformable ring forward. Flywheel 1709 rotates faster than flywheel 1704 urging a deformable ring forward until it reaches the end of base plate 1801 and is launched. For example, a deformable ring may be launched by being ejected from ring launcher system 1206 with substantial linear and angular momentum.

Figure 19A:
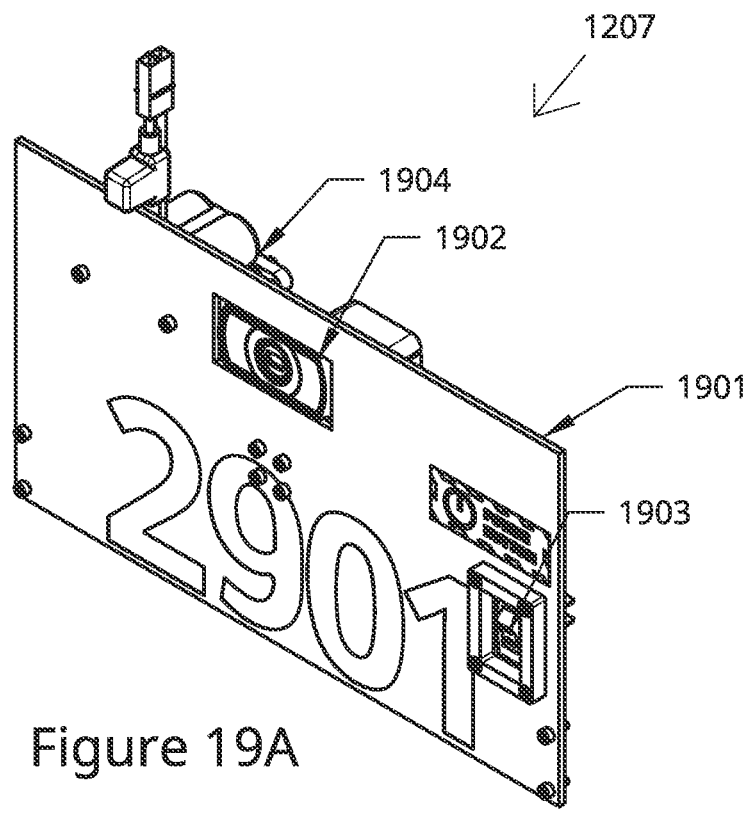
FIG. 19A is an anterior view of a camera system.

FIG. 19A provides an illustration of an anterior surface of a front plate 1901 of camera system 1207. Camera system 1207 is comprised of front plate 1901, a camera 1902, and a power switch 1903. In operation, forward-facing camera 1902 may provide visual information that is programmatically processed to identify whether a proper target is within range, prior to a deformable ring launch.

Figure 19B:
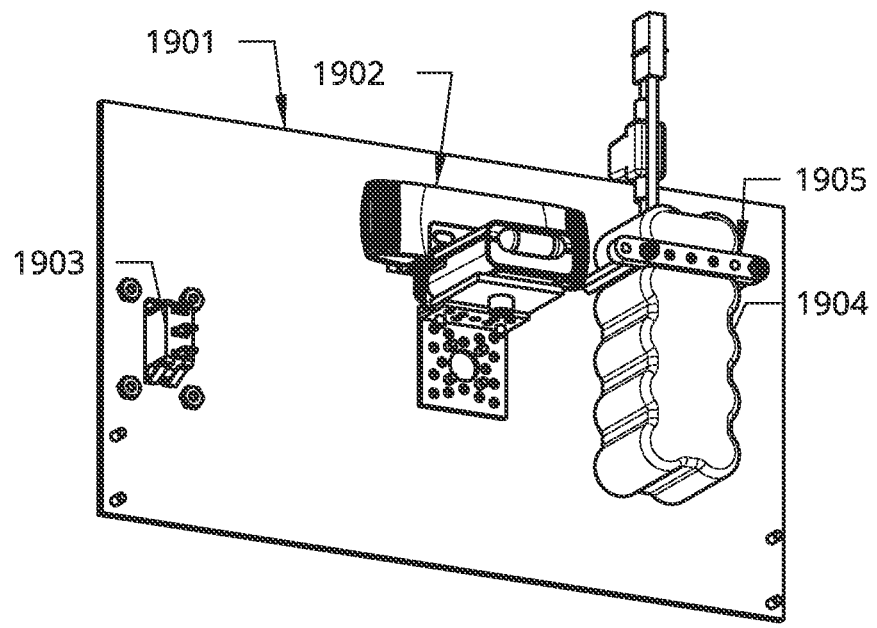
FIG. 19B is a posterior view of a camera system.

FIG. 19B provides an illustration of a posterior surface of front plate 1901 of camera system 1207. Camera system 1207 is comprised of front plate 1901, a camera 1902, a battery 1904, power switch 1903, and a beam 1905 with offsets to rigidly attach a battery 1904 to front plate 1901.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A foot-operated robot control apparatus comprising:
a foot-operated controller comprising an array of tiles, wherein at least one tile of the array of tiles is a rigid platform, and wherein at least one tile of the array of tiles is a pressure-sensitive tile that includes a pressure sensor configured to produce a first signal when a force applied to an upper surface of the pressure-sensitive tile exceeds a threshold, wherein the upper surface measures at least 144 square inches;
a controller board operatively coupled to the foot-operated controller, wherein the controller board is configured to receive the first signal produced by the pressure-sensitive tile;
a processor operatively coupled to receive a second signal from the controller board, the processor further including a first wireless communication interface operable within an unlicensed radio frequency band;
a robotic vehicle comprising:
a rigid frame supported by a plurality of wheels rotatably coupled to the frame;
at least one motor mechanically coupled to selectively provide a rotational force to at least one wheel of the plurality of wheels; and
a robot control hub affixed to the frame, wherein the robot control hub includes a second wireless communication interface configured to receive a third signal from the first wireless communication interface and, in response to the third signal, to activate at least one motor to provide the rotational force; and
a game controller,
wherein the processor is configured to give precedence to a signal received from the game controller over the second signal.

2. The foot-operated robot control apparatus of claim 1, wherein the first signal comprises a change in a voltage level.

3. The foot-operated robot control apparatus of claim 2, wherein the second signal comprises one or more messages formatted in accordance with a universal serial bus standard.

4. The foot-operated robot control apparatus of claim 3, wherein the third signal comprises one or more messages formatted in accordance with IEEE 802.11-2020.

5. The foot-operated robot control apparatus of claim 1, wherein the first signal and the second signal are electrical signals, and wherein the third signal is an electromagnetic signal.

6. The foot-operated robot control apparatus of claim 1, wherein the processor is configured to receive an override signal from the game controller and in response thereto to inhibit a response to the second signal.

7. The foot-operated robot control apparatus of claim 1 wherein the foot-operated controller further comprises a DB15 male connector containing a plurality of pins configured to propagate the first signal.

8. The foot-operated robot control apparatus of claim 1 wherein a controller board further comprises a DB15 female connector containing a plurality of receptacles to receive a plurality of DB15 male connector pins and configured to receive the first signal.

9. The foot-operated robot controller of claim 1 wherein the robotic vehicle further comprises:
   a plurality of channel brackets arising from and attached to the rigid frame;
   a claw arm structure attached to two channel brackets of the plurality of channel brackets, wherein the claw arm structure comprises a claw arm, a claw affixed to an end of the claw arm, and a motor attached to the claw, wherein the motor is operative to move a component of the claw;
   an arm motor attached to the claw arm structure through one or more apertures in each of the two channel brackets and operative to selectively rotate the claw arm structure clockwise or counterclockwise about a shaft;
   a potentiometer shaft gear affixed to the shaft;
   a potentiometer gear rotationally coupled to the potentiometer shaft gear;
   a potentiometer shaft affixed to the potentiometer gear; and
   a potentiometer affixed to the potentiometer shaft; wherein the robot control hub is communicably coupled to the potentiometer and configured to receive data from the potentiometer to determine whether a claw arm position is within a predetermined range.

10. The foot-operated robot controller of claim 1 wherein the robotic vehicle further comprises:
    a ring intake structure attached to the rigid frame, wherein the ring intake structure comprises a motor attached to a top surface of the rigid frame, a first flywheel attached to the rigid frame and affixed to the motor, a second flywheel attached to the rigid frame, wherein the second flywheel is configured to rotate contrariwise to the first flywheel, wherein here the shortest distance between the first flywheel and the second flywheel is between an upper boundary and a lower boundary, wherein the lower boundary is 5 mm less than a diameter of a deformable ring, and wherein the upper boundary is the diameter of the deformable ring;
    a ring transfer structure attached to the rigid frame, wherein the ring transfer structure comprises a base plate attached to the rigid frame, a compression bar rigidly attached to the base plate, a top plate rigidly attached to the compression bar, a motor rigidly attached to a top surface of the top plate, a shaft affixed to the motor, a belt rotationally coupled to the shaft, a stopping plate rigidly attached to the compression bar, and a ramp rigidly attached the base plate, wherein the ramp is configured to accept a deformable ring from the ring intake system;
    a ring stacker structure attached to the rigid frame, wherein the ring stacker structure comprises a plurality of aiming brackets attached to the rigid frame, a base attached to the aiming brackets, a channel bracket attached to the aiming brackets, a kicker motor attached to the channel bracket, a right plate attached to the kicker motor, a back plate attached to the base, and a left plate attached to the aiming brackets, wherein a top surface of the base is configured to receive a first deformable ring, wherein the base, left plate, right plate, and back plate are configured to receive and store a plurality of deformable rings, wherein the plurality of deformable rings are configured to store a plurality of deformable rings on top of the first deformable ring, wherein the kicker motor is operative to selectively rotate a kicker clockwise or counterclockwise about a kicker shaft;
    a flywheel driver structure attached to the rigid frame, wherein the flywheel structure comprises a side bar, a front shaft rotationally coupled to a front flywheel gear through one or more apertures in the side bar, a front flywheel affixed to the front shaft, a front motor attached to the side bar, a front motor shaft affixed to the front motor gear, wherein the front motor gear is rotationally coupled to the front flywheel gear; a back shaft rotationally coupled to a back flywheel gear through one or more apertures in the side bar, a back flywheel affixed to the back shaft, a back motor attached to the side bar, and a back motor shaft affixed to the back motor gear, wherein the back motor gear is rotationally coupled to the back flywheel gear, wherein the gear ratios of the front flywheel gear and the front motor gear are different than the back flywheel gear and the back motor gear, wherein control of the front motor is independent of the back motor;
    a ring launcher structure attached to the rigid frame, wherein the ring launcher structure comprises a plurality of aiming brackets attached to the rigid frame, a base plate attached to the aiming brackets, a compression plate attached to a top surface of the base plate, a top plate attached to a top surface of the compression plate, a middle bracket attached to the top surface of the top plate, and a back bracket attached to the top surface of the base plate, and wherein the ring launcher structure is configured to launch the deformable ring from the top surface of the base plate;
    a camera structure attached to the rigid frame, wherein the camera structure comprises a front plate attached to the rigid frame, a camera attached to the front plate, a power switch attached to front surface of the front plate, and a battery attached to a back surface of the front plate, wherein the robot control hub communicably is coupled to the camera and configured to receive data from the camera to determine whether the robotic vehicle is oriented in a safe predetermined zone prior to launch.

11. A method of operating a robotic vehicle via a foot-operable controller, the foot-operated controller comprising a plurality of pressure-sensitive tiles surrounding a rigid platform, the method comprising:
    depressing a pressure-sensitive tile with a lower limb of a primate;
    receiving at a controller board a first signal from the pressure-sensitive tile indicating that the pressure-sensitive tile has been activated;
    in response to receiving the first signal, generating at the controller board a second signal indicating that a button on the controller board has been pressed;
    receiving at a processor the second signal;
    in response to receiving the second signal, generating by the processor a third signal and wirelessly transmitting the third signal;
    receiving at a robot control hub the third signal;
    in response to receiving the third signal, activating at least one motor on the robotic vehicle;
    receiving at the processor a fourth signal from a game controller; and
    in response to receiving the fourth signal, ceasing by the processor to respond to signals received from the controller board.

12. The method of claim 11, wherein the primate is a human and the lower limb is a foot.

13. The method of claim 11, wherein the first signal comprises a change in a voltage differential, the second signal comprises a message formatted in accordance with a universal serial bus standard, and the third signal comprises a message formatted in accordance with IEEE 802.11-2020.

14. The method of claim 11, wherein activating at least one motor causes the robotic vehicle to perform an action selected from the group consisting of: driving in a first direction, driving in a second direction opposite the first direction, turning clockwise, and turning counterclockwise.

15. The method of claim 14, wherein activating at least one motor comprises activating at least two wheels.

16. The method of claim 11, wherein activating at least one motor causes the robotic vehicle to perform an action selected from the group consisting of: opening a claw, closing a claw, raising a claw, and lowering a claw.

17. The method of claim 11, wherein activating at least one motor causes the robotic vehicle to perform an action selected from the group consisting of: ingesting an object, and throwing an object.

* * * * *